(12) United States Patent
Chen et al.

(10) Patent No.: US 12,265,233 B2
(45) Date of Patent: Apr. 1, 2025

(54) METHOD FOR INCREASING SPECKLE SPOT DENSITY, DIFFRACTIVE OPTICAL ELEMENT, AND PROJECTOR

(71) Applicant: JIAXING UPHOTON OPTOELECTRONICS TECHNOLOGY CO., LTD., Zhejiang (CN)

(72) Inventors: Peng Chen, Zhejiang (CN); Lei Sui, Zhejiang (CN)

(73) Assignee: JIAXING UPHOTON OPTOELECTRONICS TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/928,971

(22) Filed: Oct. 28, 2024

(65) Prior Publication Data
US 2025/0053023 A1    Feb. 13, 2025

Related U.S. Application Data

(63) Continuation of application No. PCT/CN2023/095502, filed on May 22, 2023.

(51) Int. Cl.
*G02B 27/48* (2006.01)
*G01B 11/25* (2006.01)
(Continued)

(52) U.S. Cl.
CPC .......... *G02B 27/48* (2013.01); *G01B 11/254* (2013.01); *G02B 27/0012* (2013.01); *G02B 27/0905* (2013.01); *G02B 27/0944* (2013.01)

(58) Field of Classification Search
CPC .............. G02B 27/48; G02B 27/0012; G02B 27/0905; G02B 27/0944; G01B 11/254
(Continued)

(56) References Cited

U.S. PATENT DOCUMENTS

2016/0178915 A1* 6/2016 Mor ................. G02B 27/20
                                                    359/566
2022/0357586 A1   11/2022 Wang et al.

FOREIGN PATENT DOCUMENTS

CN    107703641 A    2/2018
CN    109270699 A    1/2019
(Continued)

OTHER PUBLICATIONS

English translation of Chinese Office Action issued in CN202210751032. X, mailed May 30, 2023.
(Continued)

*Primary Examiner* — Wyatt A Stoffa
*Assistant Examiner* — Mitchell T Oestreich
(74) *Attorney, Agent, or Firm* — Meunier Carlin & Curfman LLC

(57) ABSTRACT

A method for increasing speckle spot density, comprising: acquiring light splitting dot array, which is used for performing array copying on multi-point light source and projection to form speckle spot array; acquiring minimum neighboring point spacing or average value of neighboring point spacing of all or part of light-emitting points in the multi-point light source; dividing light splitting dot array into first light splitting dot array and second light splitting dot array, speckle spot array formed by projection by first light splitting dot array being located in first speckle spot area, and speckle spot array formed by projection by second light splitting dot array being located in second speckle spot area; and performing expansive copying on each light splitting dot in second light splitting dot array so as to form third light splitting dot array.

20 Claims, 11 Drawing Sheets

(51) Int. Cl.
　　　*G02B 27/00*　　　(2006.01)
　　　*G02B 27/09*　　　(2006.01)
(58) Field of Classification Search
　　　USPC .......................................................... 359/558
　　　See application file for complete search history.

(56) References Cited

FOREIGN PATENT DOCUMENTS

| CN | 110346944 A | 10/2019 |
|---|---|---|
| CN | 110824721 A | 2/2020 |
| CN | 110954917 A | 4/2020 |
| CN | 111781665 A | 10/2020 |
| CN | 111884049 A | 5/2021 |
| CN | 113534483 A | 10/2021 |
| CN | 114371554 A | 4/2022 |
| CN | 114502985 A | 5/2022 |
| CN | 115016202 A | 9/2022 |

OTHER PUBLICATIONS

English translation of Chinese Search Report issued in CN202210751032.X, mailed May 30, 2023.
English translation of Chinese Office Action issued in CN202210751032.X, mailed Nov. 14, 2023.
English translation of Chinese Search Report issued in CN202210751032.X, mailed Nov. 3, 2023.
English translation of Chinese Search Report issued in CN202210751032.X, mailed Feb. 28, 2024.

\* cited by examiner

METHOD FOR INCREASING SPECKLE SPOT DENSITY, DIFFRACTIVE OPTICAL ELEMENT, AND PROJECTOR

CROSS REFERENCE TO RELATED APPLICATIONS

The present disclosure is a National Stage of International Application No. PCT/CN2023/095502, filed May 22, 2023, which claims priority to the Chinese patent application No. 202210751032.X filed on Jun. 28, 2022.

TECHNICAL FIELD

The present disclosure relates to the technology field of diffraction optics, and in particular, to a method for increasing a speckle density, a diffractive optical element, and a projector.

BACKGROUND

For applications of binocular vision or 3D structured light, the recognition algorithms require the speckle array projected by a projector to have high recognition precision. Especially, the demand for the large field of view is increasingly wide, and the speckle density in the field of view, especially at the large field of view angle, is required to be higher.

The speckle projector in a 3D recognition system mostly adopts the scheme of light source+collimator+diffractive beam splitter or the scheme of light source+diffractive beam splitter, and the diffractive beam splitter is used for implementing the array replication of the light source. When the speckle array is projected onto a planar viewing screen, the speckle density at the edge of a field of view decreases significantly compared with the speckle density at the center of the field of view due to the distortion effect, resulting in a decrease in the 3D recognition precision.

The content in the Background is merely techniques known to the inventors and does not necessarily represent the existing art in the art.

SUMMARY

In view of one or more existing deficiencies, the present disclosure provides a method for increasing a speckle density. The method includes steps S11 to S14.

In step S11, a beam-splitting point array is acquired, where the beam-splitting point array is used for performing array replication and projection on a multi-point light source to form a speckle array.

In step S12, a minimum adjacent point spacing or an average adjacent point spacing of all or some of light-emitting points in the multi-point light source is acquired.

In step S13, the beam-splitting point array is divided into a first beam-splitting point array and a second beam-splitting point array, where a speckle array formed by projection through the first beam-splitting point array is located in a first speckle region, and a speckle array formed by projection through the second beam-splitting point array is located in a second speckle region.

In step S14, extension replication is performed on each beam-splitting point in the second beam-splitting point array according to the minimum adjacent point spacing or the average adjacent point spacing of all or some of the light-emitting points to form a third beam-splitting point array, where a speckle array formed by projection through the third beam-splitting point array falls in the second speckle region to increase the speckle density in the second speckle region and keep the speckle density in the first speckle region unchanged.

According to one aspect of the present disclosure, the second beam-splitting point array includes at least one of:
- a columns of beam-splitting points on the leftmost side of the beam-splitting point array;
- b columns of beam-splitting points on the rightmost side of the beam-splitting point array;
- c rows of beam-splitting points on the uppermost side of the beam-splitting point array;
- d rows of beam-splitting points on the bottommost side of the beam-splitting point array; or
- e beam-splitting points in the central region of the beam-splitting point array;

where a, b, c, d, and e are all positive integers.

According to one aspect of the present disclosure, a, b, c, and d are all positive integers less than or equal to 5.

According to one aspect of the present disclosure, the speckle array formed by projection through the third beam-splitting point array does not overlap with the speckle array formed by projection through the second beam-splitting point array, and the light-emitting points of the multi-point light source are regularly arranged or randomly arranged.

According to one aspect of the present disclosure, when the light-emitting points of the multi-point light source are randomly arranged, the coordinates of a point A in the second beam-splitting point array are $(k_{xm}, k_{yn})$, the coordinates of a point A' obtained by performing extension replication on the point A are $(k_{xm}', k_{yn}')$, the coordinates of the point A and the coordinates of the point A' meet a grating equation, the vector between the coordinates of the point A and the coordinates of the point A' is e, and the angle sine spacings between the point A and the point A' in an x-direction and a y-direction meet:

$$\sin(\theta_{xm}') - \sin(\theta_{xm}) \approx \frac{e_x}{2f}$$

$$\sin(\theta_{yn}') - \sin(\theta_{yn}) \approx \frac{e_y}{2f}$$

where $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

According to one aspect of the present disclosure, the minimum adjacent point spacing or the average adjacent point spacing of the speckle array formed by projection through the second beam-splitting point array is E, and the distance between the speckle array formed by projection through the third beam-splitting point array and the speckle array formed by projection through the second beam-splitting point array is 0.4 E to 0.6 E.

According to one aspect of the present disclosure, the step S14 includes: performing extension replication, according to the minimum adjacent point spacing or the average adjacent point spacing, on each beam-splitting point in the second beam-splitting point array to form the third beam-splitting point array, where the extending direction of each beam-splitting point is a direction of a line connecting the beam-splitting point with the center of the beam-splitting point array as a starting point.

According to one aspect of the present disclosure, the step S14 further includes: determining, according to the position of each beam-splitting point in the second beam-splitting point array, the extending direction of each beam-splitting point, and the minimum adjacent point spacing or the average adjacent point spacing, the position of each beam-splitting point in the third beam-splitting point array.

According to one aspect of the present disclosure, the step S11 further includes: designing, according to a large period design method, the beam-splitting point array, where the arrangement manner of the beam-splitting point array is a regular arrangement or a longitudinal and/or transverse periodic misalignment arrangement.

According to one aspect of the present disclosure, the large period design method includes: in response to a diffractive optical element corresponding to an initial beam-splitting point array having a transverse period of $P_h$, a longitudinal period of $P_u$, a transverse target order of [−i, −i+1, . . . , i−1, i], and a longitudinal target order of [−j, −j+1, . . . , j−1, j], performing array replication on the transverse period and the longitudinal period of the diffractive optical element corresponding to the initial beam-splitting point array by a factor of M and N, respectively, where a diffractive optical element corresponding to the designed beam-splitting point array has a transverse period of $P_h'=M \times P_h$, a longitudinal period of $P_u'=N \times P_u$, a transverse target order of M×[−i, −i+1, . . . , i−1, i], and a longitudinal target order of N×[−j, −j+1, . . . , j−1, j].

According to one aspect of the present disclosure, the method further includes step S15.

In step S15: perturbation is performed on at least some of the points in the extended beam-splitting point array with a preset perturbation quantity.

According to one aspect of the present disclosure, the step S15 further includes: performing transverse and/or longitudinal random perturbation on at least some of the points in the extended beam-splitting point array to reduce the non-uniformity of a speckle array formed by projection.

The present disclosure further relates to a diffractive optical element. The diffractive optical element implements a function of increasing a speckle density of a projected speckle array by performing array replication on a multi-point light source and extension replication and includes a beam-splitting point array.

The beam-splitting point array includes a first beam-splitting point array, a second beam-splitting point array, and a third beam-splitting point array.

The first beam-splitting point array is used for performing array replication and projection on the multi-point light source to form a speckle array located in a first speckle region.

The second beam-splitting point array is used for performing array replication and projection on the multi-point light source to form a speckle array located in a second speckle region.

The third beam-splitting point array is formed by performing extension replication, according to a minimum adjacent point spacing or an average adjacent point spacing of all or some of the light-emitting points in the multi-point light source, on each beam-splitting point in the second beam-splitting point array, where a speckle array formed by performing array replication and projection on the multi-point light source by the third beam-splitting point array falls in the second speckle region to increase the speckle density in the second speckle region and keep the speckle density in the first speckle region unchanged.

According to one aspect of the present disclosure, the second beam-splitting point array includes at least one of:
a columns of beam-splitting points on the leftmost side of the beam-splitting point array;
b columns of beam-splitting points on the rightmost side of the beam-splitting point array;
c rows of beam-splitting points on the uppermost side of the beam-splitting point array;
d rows of beam-splitting points on the bottommost side of the beam-splitting point array; or
e beam-splitting points in the central region of the beam-splitting point array; where a, b, c, d, and e are all positive integers.

According to one aspect of the present disclosure, a, b, c, and d are all positive integers less than or equal to 5.

According to one aspect of the present disclosure, the speckle array formed by projection through the third beam-splitting point array does not overlap with the speckle array formed by projection through the second beam-splitting point array, and the light-emitting points of the multi-point light source are regularly arranged or randomly arranged.

According to one aspect of the present disclosure, when the light-emitting points of the multi-point light source are randomly arranged, the coordinates of a point A in the second beam-splitting point array are $(k_{xm}, k_{yn})$, the coordinates of a point A' obtained by performing extension replication on the point A are $(k_{xm}', k_{yn}')$, the coordinates of the point A and the coordinates of the point A' meet a grating equation, the vector between the coordinates of the point A and the coordinates of the point A' is e, and the angle sine spacings between the point A and the point A' in an x-direction and a y-direction meet:

$$\sin(\theta_{xm}') - \sin(\theta_{xm}) \approx \frac{e_x}{2f}$$

$$\sin(\theta_{yn}') - \sin(\theta_{yn}) \approx \frac{e_y}{2f}$$

where $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

According to one aspect of the present disclosure, the minimum adjacent point spacing or the average adjacent point spacing of the speckle array formed by projection through the second beam-splitting point array is E, and the distance between the speckle array formed by projection through the third beam-splitting point array and the speckle array formed by projection through the second beam-splitting point array is 0.4 E to 0.6 E.

According to one aspect of the present disclosure, extension replication is performed on each beam-splitting point in the second beam-splitting point array according to the minimum adjacent point spacing or the average adjacent point spacing to form a third beam-splitting point array, where the extending direction of each beam-splitting point is a direction of a line connecting the beam-splitting point with the center of the beam-splitting point array as a starting point.

According to one aspect of the present disclosure, the position of each beam-splitting point in the third beam-splitting point array is determined according to the position of each beam-splitting point in the second beam-splitting point array, the extending direction of each beam-splitting point, and the minimum adjacent point spacing or the average adjacent point spacing.

According to one aspect of the present disclosure, the beam-splitting point array is designed according to a large period design method, where the arrangement manner of the beam-splitting point array is a regular arrangement or a longitudinal and/or transverse periodic misalignment arrangement.

According to one aspect of the present disclosure, the large period design method includes: in response to a diffractive optical element corresponding to an initial beam-splitting point array having a transverse period of $P_h$, a longitudinal period of $P_u$, a transverse target order of [−i, −i+1, ..., i−1, i], and a longitudinal target order of [−j, −j+1, ..., j−1, j], performing array replication on the transverse period and the longitudinal period of the diffractive optical element corresponding to the initial beam-splitting point array by a factor of M and N, respectively, where a diffractive optical element corresponding to the designed beam-splitting point array has a transverse period of $P_h'=M \times P_h$, a longitudinal period of $P_u'=N \times P_u$, a transverse target order of M×[−i, −i+1, ..., i−1, i], and a longitudinal target order of N×[−j, −j+1, ..., j−1, j].

According to one aspect of the present disclosure, perturbation is performed on at least some of the points in the extended beam-splitting point array with a preset perturbation quantity.

According to one aspect of the present disclosure, transverse and/or longitudinal random perturbation is performed on at least some of the points in the extended beam-splitting point array to reduce the non-uniformity of a speckle array formed by projection.

The present disclosure further provides a projector. The projector includes a multi-point light source and a diffractive optical element described above.

The multi-point light source is used for generating a light beam.

The diffractive optical element is disposed downstream of an optical path of the multi-point light source and is spaced by a preset distance from the multi-point light source.

In the present disclosure, the speckle density in a specific region can be increased, no adhesion exists between speckles, and the requirements for large fields of view and high recognition precision in the 3D recognition applications are met. Especially for the speckle array projected onto a planar viewing screen, which has the problem of a significant decrease in the speckle density at the edge due to the distortion effect, the improvement effect on the recognition precision becomes better.

BRIEF DESCRIPTION OF THE DRAWINGS

The drawings constituting a part of the present disclosure are used to provide a further understanding of the present disclosure. The exemplary embodiments and descriptions thereof in the present disclosure are used to explain the present disclosure and do not constitute an undue limitation on the present disclosure. In the drawings:

FIG. 8b shows a schematic diagram of speckle blocks and a speckle array in the embodiment of FIG. 8a;

FIG. 8c shows a schematic diagram of a beam-splitting point array, speckle blocks, and a speckle array obtained after extension replication of the embodiment of FIG. 8a;

FIG. 9b shows a schematic diagram of speckle blocks and a speckle array in the embodiment of FIG. 9a;

FIG. 9c shows a schematic diagram of a beam-splitting point array, speckle blocks, and a speckle array obtained after extension replication of the embodiment of FIG. 9a;

FIG. 10b shows a schematic diagram of speckle blocks and a speckle array in the embodiment of FIG. 10a; and FIG. 10c shows a schematic diagram of a beam-splitting point array, speckle blocks, and a speckle array obtained after extension replication of the embodiment of FIG. 10a.

DETAILED DESCRIPTION

Figure 1A:
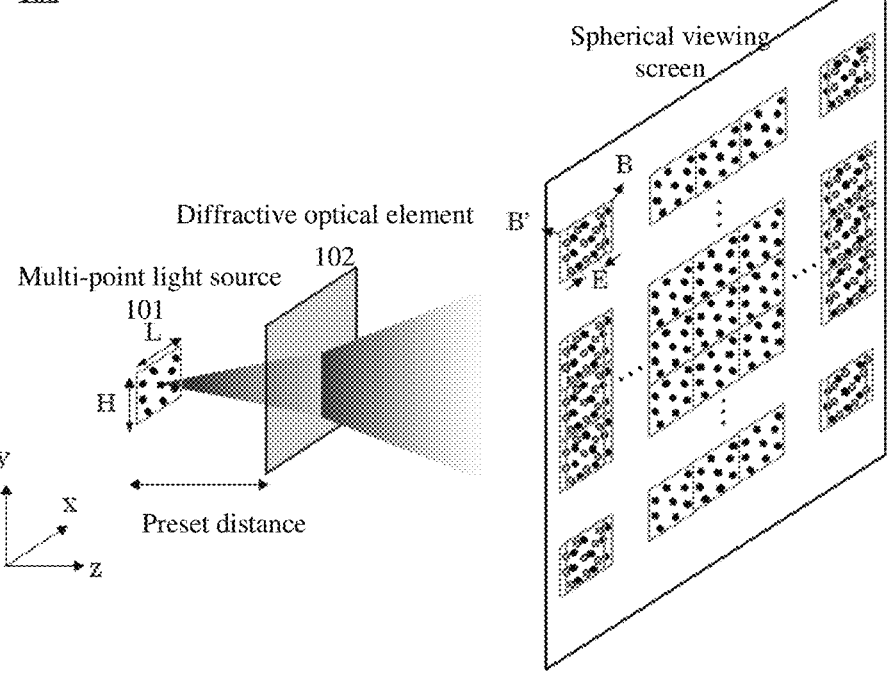
FIG. 1a shows a schematic diagram of a system architecture of a projector according to an embodiment of the present disclosure.

Hereinafter, certain exemplary embodiments are simply described. As those skilled in the art would realize, the described embodiments may be modified in various ways, without departing from the spirit or scope of the present disclosure. Accordingly, the drawings and descriptions are to be regarded as illustrative in nature and not restrictive.

In the description of the present disclosure, it is to be understood that the orientation or position relationships indicated by terms "center", "longitudinal", "transverse", "length", "width", "thickness", "above", "below", "front", "back"," "left", "right", "vertical", "horizontal", "top", "bottom", "inside", "outside", "clockwise", "counterclockwise", etc. are based on the orientation or position relationships shown in the drawings, merely for facilitating the description of the present disclosure and simplifying description, and do not indicate or imply that the apparatus or element referred to has a specific orientation and is constructed and operated in a specific orientation, and thus it is not to be construed as limiting the present disclosure. Moreover, terms like "first" and "second" are for the purpose of description only and are not to be construed as indicating or implying relative importance or implicitly indicating the number of technical features as indicated. Thus, the features defined with "first" and "second" may explicitly or implicitly include one or more of the features. In the description of the present disclosure, the meaning of "plurality" is two or more, unless otherwise specifically limited.

In the description of the present disclosure, it is to be noted that, unless otherwise clearly specified and defined, the terms "installation", "connection", and "connection to each other" should be construed in a broad sense, for example, it may be a fixed connection or a detachable connection, or an integral connection; it can be a mechanical connection, an electrical connection, or a mutual communication; it can be a direct connection or an indirect connection through an intermediary, it can be an internal connection of two components or an interaction between two components. For those of ordinary skill in the art, specific meanings of the preceding terms in the present disclosure may be understood according to specific situations.

In the present disclosure, unless otherwise clearly specified and defined, a first feature "on" or "beneath" a second feature may include direct contact between the first and second features, or contact via another feature therebetween, other than the direct contact. Moreover, the first feature "on", "above" or "over" the second feature includes the case that the first feature is directly above and obliquely above the second feature, or simply means that the level of the first feature is higher than that of the second feature. The first feature "beneath", "below" or "under" the second feature includes the case that the first feature is directly below and obliquely below the second feature, or simply means that the level of the first feature is lower than that of the second feature.

The following disclosure provides many different embodiments or examples for implementing different structures of the present disclosure. To simplify the present disclosure, components and configurations of particular examples will be described below, which are, of course, illustrative only and are not intended to limit the present disclosure. In addition, the present disclosure may repeat reference numerals and/or letters in the various examples. This repetition is for the purpose of simplicity and clarity and does not in itself dictate a relationship between the various embodiments and/or configurations discussed. In addition, the present disclosure provides examples of various specific processes and materials; however, those of ordinary skill in the art may recognize applicability to other processes and/or use of other materials.

Preferred embodiments of the present disclosure will be described in detail in conjunction with the drawings, and it should be understood that the preferred embodiments described herein are only intended to describe and explain the present disclosure and not to limit the present disclosure.

FIG. 1a shows a schematic diagram of a system architecture of a projector according to an embodiment of the present disclosure. The projector 100 includes a multi-point light source 101 and a diffractive optical element 102. The multi-point light source 101, for example, is a light source composed of multiple vertical-cavity surface-emitting lasers (VCSELs) and is used for generating light beams to form an input light field. The diffractive optical element 102 is disposed downstream of an optical path of the multi-point light source 101 and is used for receiving the light beams emitted from the multi-point light source 101 and modulating the input light field to form an output light field. The diffractive optical element 102 is spaced by a preset distance from the multi-point light source 101. Preferably, when the input light field is diverging light, the collimating lens function is superimposed in the diffractive optical element 102. The preset distance is the focal length of the collimating lens.

Figure 2:
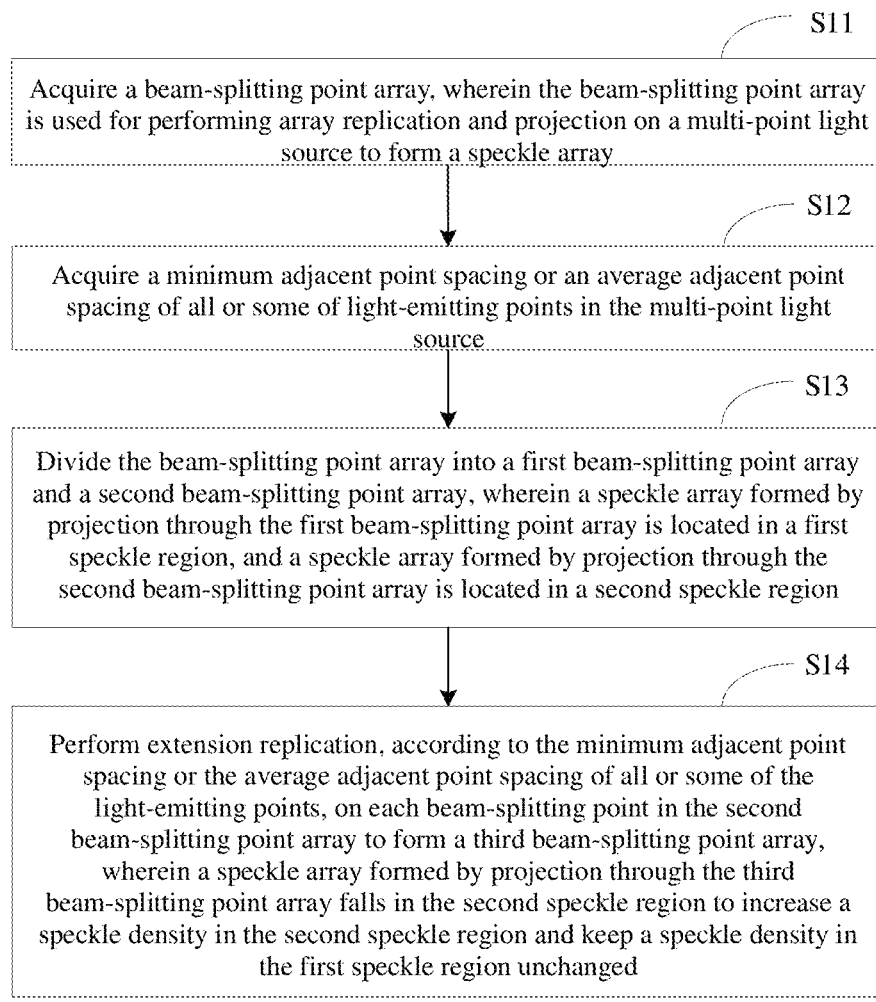
FIG. 2 shows a flowchart of a method for increasing a speckle density according to an embodiment of the present disclosure.

FIG. 2 shows a flowchart of a method for increasing a speckle density according to an embodiment of the present disclosure. The method for increasing a speckle density specifically includes steps S11 to S14.

In step S11, a beam-splitting point array is acquired, where the beam-splitting point array is used for performing array replication and projection on a multi-point light source to form a speckle array.

Figure 1B:
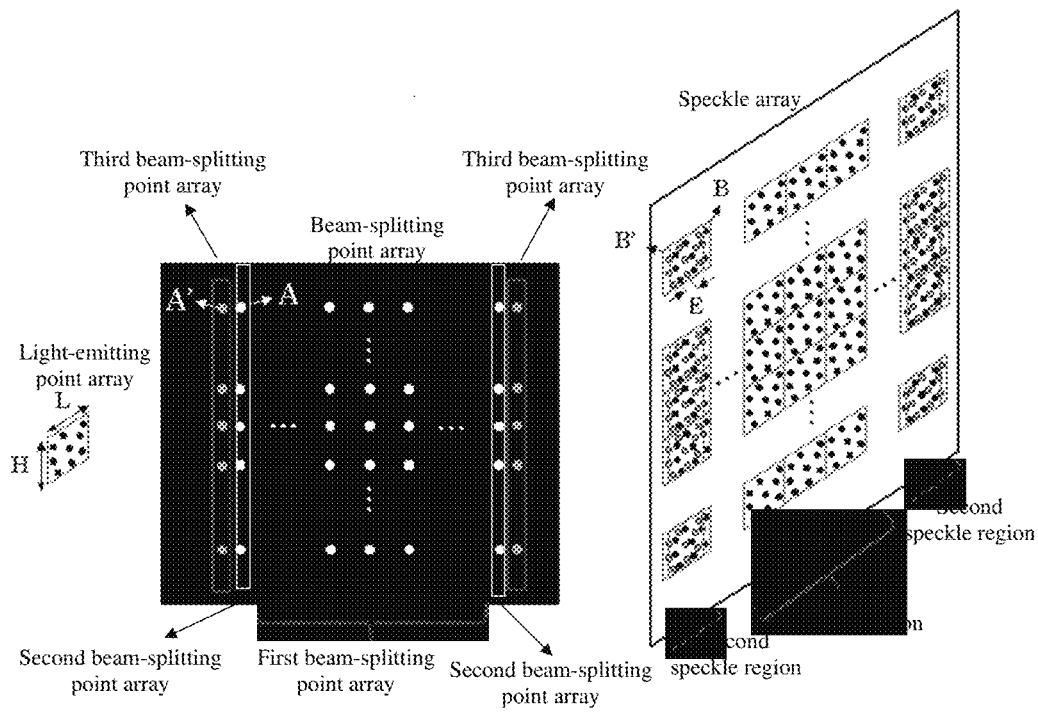
FIG. 1b shows a schematic diagram of a light-emitting point array, a beam-splitting point array, and a speckle array according to an embodiment of the present disclosure.

FIG. 1b shows a schematic diagram of a light-emitting point array, a beam-splitting point array, and a speckle array according to an embodiment of the present disclosure. In conjunction with FIG. 1a, the lasers in the multi-point light source 101 are arranged to form a light-emitting point array, and the light beams emitted from the multi-point light source 101 are modulated by the diffractive optical element 102 to form a speckle array. That is, a beam-splitting point array of the diffractive optical element 102 is acquired, and array replication is performed on the light-emitting point array according to the arrangement of the beam-splitting point array to form a speckle array.

In step S12, a minimum adjacent point spacing or an average adjacent point spacing of all or some of the light-emitting points in the multi-point light source is acquired.

With continued reference to FIGS. 1a-1b, the multi-point light source 101 includes x lasers forming x light-emitting points that may be regularly arranged or randomly arranged. The x light-emitting points form a light-emitting point array with a length of L and a height of H. In some embodiments, x light-emitting points are randomly arranged, adjacent point spacings of all x light-emitting points are calculated, and a minimum adjacent point spacing is determined. In other embodiments, x light-emitting points are randomly arranged, and an average adjacent point spacing of all x light-emitting points is calculated. In other embodiments, x light-emitting points are regularly arrayed, and only a minimum adjacent point spacing or an average adjacent point spacing of any two adjacent light-emitting points or some of the light-emitting points is calculated.

In step S13, the beam-splitting point array is divided into a first beam-splitting point array and a second beam-splitting point array, where a speckle array formed by projection through the first beam-splitting point array is located in a first speckle region, and a speckle array formed by projection through the second beam-splitting point array is located in a second speckle region.

With continued reference to FIGS. 1a-1b, the beam-splitting point array is divided into two portions, i.e., a first beam-splitting point array and a second beam-splitting point array, to facilitate the application of different point density adjustment schemes to different regions. In a specific embodiment, the middle portion of the beam-splitting point array is classified as the first beam-splitting point array, the left and right edge portions of the beam-splitting point array are classified as the second beam-splitting point array, and the second beam-splitting point array is separated by the first beam-splitting point array into a left-sided portion and a right-sided portion. Similarly, a speckle array formed by projection through the first beam-splitting point array is located in a first speckle region, that is, in the middle portion of the entire speckle region; a speckle array formed by projection through the second beam-splitting point array on the left side is located in a second speckle region on the left side, and a speckle array formed by projection through the second beam-splitting point array on the right side is located in a second speckle region on the right side.

The division manner, size, boundary, or number of the first beam-splitting point array and the second beam-splitting point array are not limited in the present disclosure. For example, in some embodiments, the middle portion of the beam-splitting point array is classified as the first beam-splitting point array, and the upper and lower edge portions thereof are classified as the second beam-splitting point array. In other embodiments, the upper portion of the beam-splitting point array is classified as the first beam-splitting point array, and the lower portion thereof is classified as the second beam-splitting point array. The above settings are within the scope of protection of the present disclosure.

In step S14, extension replication is performed on each beam-splitting point in the second beam-splitting point array according to the minimum adjacent point spacing or the average adjacent point spacing of all or some of the light-emitting points to form a third beam-splitting point array, where a speckle array formed by projection through the third beam-splitting point array falls in the second speckle region to increase the speckle density in the second speckle region and keep the speckle density in the first speckle region unchanged.

In a specific embodiment, the beam-splitting point array is uniformly arranged. When a speckle array formed by performing array replication on the light-emitting point array through the beam-splitting point array is projected onto a spherical viewing screen, the light-emitting point array after array replication appears to be uniformly arranged. However, when the speckle array is projected onto a planar viewing screen, the speckle array at the center of the field of view is roughly uniformly arranged, but due to the distortion effect, the speckle density of the speckle array at the large field of view angle decreases significantly compared with the speckle density at the center of the field of view, resulting in a decrease in the recognition precision.

In order to solve the above problem, with continued reference to FIG. 1b, the middle portion of the beam-splitting point array is classified as the first beam-splitting point array, and the left and right edge portions of the beam-splitting point array are classified as the second beam-splitting point array. In order to increase the speckle density at the edge, extension replication is performed on each beam-splitting point in the second beam-splitting point array to form a third beam-splitting point array, and a speckle array formed by projection through the third beam-splitting point array falls in the second speckle region to increase the speckle density in the second speckle region and keep the speckle density in the first speckle region unchanged.

By performing extension replication on beam-splitting points in a specific region of the beam-splitting point array, the speckle density in a corresponding speckle region can be increased. Further, since the newly added speckles and the original speckles in the region should be distinguished from each other, in step S12, the minimum adjacent point spacing or the average adjacent point spacing of all or some of light-emitting points in the light-emitting point array is acquired, and then extension replication is performed on beam-splitting points according to the minimum adjacent point spacing or the average adjacent point spacing to ensure that the newly added speckles and the original speckles only partially overlap or are spaced by a certain spacing.

According to a preferred embodiment of the present disclosure, the step S14 includes: performing extension replication, according to the minimum adjacent point spacing or the average adjacent point spacing, on each beam-splitting point in the second beam-splitting point array to form a third beam-splitting point array, where the extending direction of each beam-splitting point is a direction of a line connecting the beam-splitting point with the center of the beam-splitting point array as a starting point.

Figure 3:
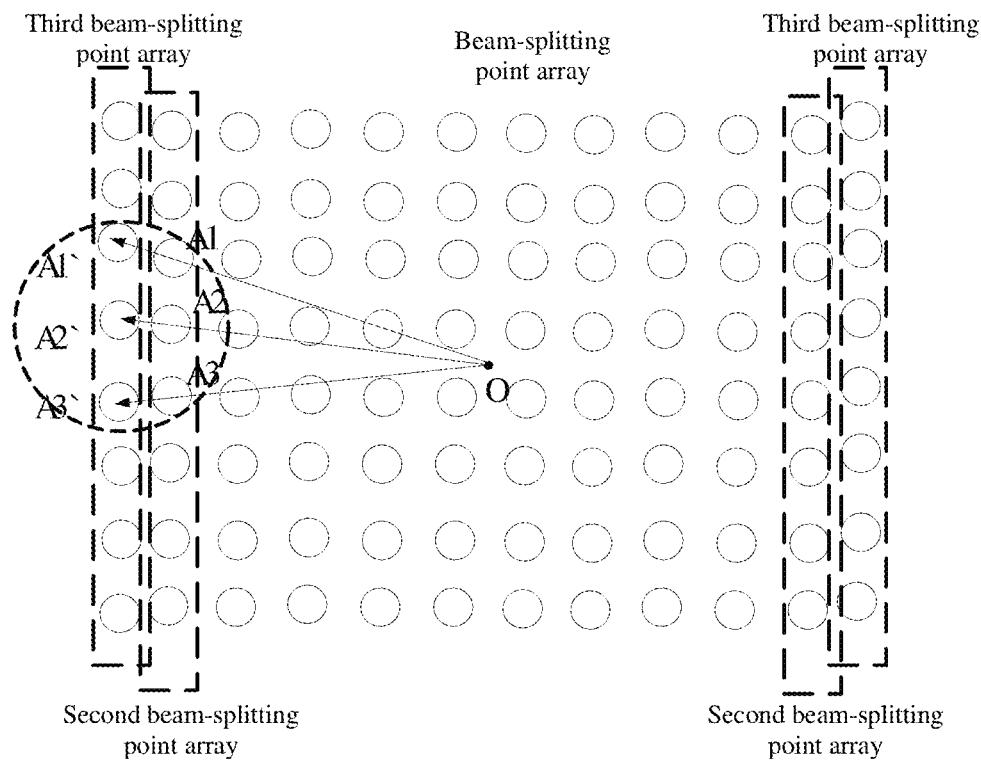
FIG. 3 shows a schematic diagram of a beam-splitting point array and the extending direction thereof according to an embodiment of the present disclosure.
Figure 4:
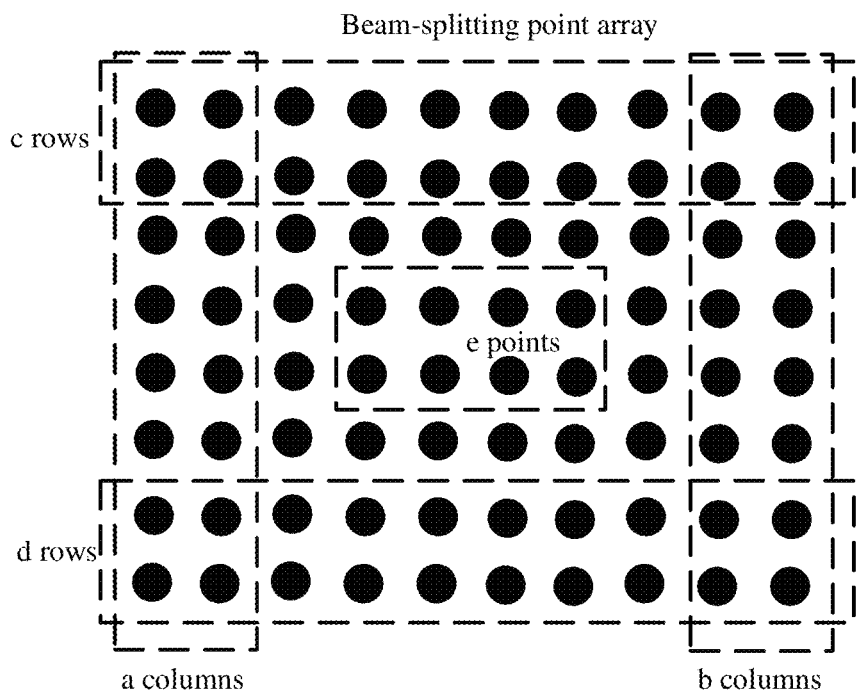
FIG. 4 shows a schematic diagram of beam-splitting point region division according to an embodiment of the present disclosure.

FIG. 3 shows a schematic diagram of a beam-splitting point array and the extending direction thereof according to an embodiment of the present disclosure. With hollow circles as beam-splitting points, the leftmost column and the rightmost column of the initial beam-splitting point array are classified as the second beam-splitting point array, and extension replication is performed on each beam-splitting point in the second beam-splitting point array to form the third beam-splitting point array. The third beam-splitting point array includes one column of newly added beam-splitting points on the left side of the initial beam-splitting point array and one column of newly added beam-splitting points on the right side of the initial beam-splitting point array. As shown in the dashed circular region in FIG. 3, extension replication is performed on the beam-splitting point A1 in the second beam-splitting point array in the direction of an arrow to form the beam-splitting point A1', extension replication is performed on the beam-splitting point A2 in the direction of an arrow to form the beam-splitting point A2', and extension replication is performed on the beam-splitting point A3 in the direction of an arrow to form the beam-splitting point A3'. The extending direction and displacement of each light-splitting point may be different. The extending direction is the direction of a line connecting the light-splitting point with the center O of the light-splitting point array as a starting point, and the displacement may be determined with reference to the minimum adjacent point spacing or the average adjacent point spacing of all or some of the light-emitting points in the multi-point light source 101 or determined through multiple simulations according to the minimum adjacent point spacing or the average adjacent point spacing to prevent the extended point from adhering to the light-emitting point. Those skilled in the art may understand that FIG. 3 is only for the purpose of illustration, and the size, spacing, and extending direction of the beam-splitting point do not constitute a limitation on this embodiment.

According to a preferred embodiment of the present disclosure, the step S14 further includes: determining, according to the position of each beam-splitting point in the second beam-splitting point array, the extending direction of each beam-splitting point and the minimum adjacent point spacing or the average adjacent point spacing, the position of each beam-splitting point in the third beam-splitting point array.

With continued reference to FIG. 3, the position of each beam-splitting point in the third beam-splitting point array is determined according to the position of each beam-splitting point in the second beam-splitting point array, the extending direction of each beam-splitting point, and the minimum adjacent point spacing or the average adjacent point spacing of all or some of light-emitting points in the multi-point light source 101 to increase the speckle density in the corresponding second speckle region and prevent the speckles from adhering to each other, thereby proving high recognition precision.

The method of how to increase the speckle density in a specific region is described overall through steps S11-S14, which increases the speckle density while ensuring high recognition precision, and the method will be described in detail below through preferred embodiments.

According to a preferred embodiment of the present disclosure, the second beam-splitting point array includes at least one of:

a columns of beam-splitting points on the leftmost side of the beam-splitting point array;
b columns of beam-splitting points on the rightmost side of the beam-splitting point array;
c rows of beam-splitting points on the uppermost side of the beam-splitting point array;
d rows of beam-splitting points on the bottommost side of the beam-splitting point array; or
e beam-splitting points in the central region of the beam-splitting point array; where a, b, c, d, and e are all positive integers.

FIG. 3 shows a schematic diagram of a beam-splitting point array according to an embodiment of the present disclosure. To increase the speckle density in the second speckle region, extension replication needs to be performed on the beam-splitting points in the corresponding second beam-splitting point array. For example, a columns of beam-splitting points on the leftmost side of the beam-splitting point array are classified as the second beam-splitting point array, so that the speckle density in the corresponding region on the left side in the speckle array can be increased; b columns of beam-splitting points on the rightmost side of the beam-splitting point array are classified as the second beam-splitting point array, so that the speckle density in the corresponding region on the right side in the speckle array can be increased; c rows of beam-splitting points on the uppermost side of the beam-splitting point array are classified as the second beam-splitting point array, the speckle density in the corresponding region on the upper side in the speckle array can be increased; d rows of beam-splitting points on the bottommost side of the beam-splitting point array are classified as the second beam-splitting point array, so that the speckle density in the corresponding region on the bottom side in the speckle array can be increased; e beam-splitting points in the central region of the beam-splitting point array are classified as the second beam-splitting point array, so that the speckle density in the corresponding region in the center of the speckle array can be increased. The above is only for the purpose of illustration, and "a" columns of, "b" columns of, "c" rows of, "d" rows of, and "e" beam-splitting points may be discretionarily combined to form the second beam-splitting point array.

According to a preferred embodiment of the present disclosure, a, b, c, and d are all positive integers less than or equal to 5.

In the embodiment of FIG. 3, a=2, b=2, c=2, d=2, and e=8, which is only for the purpose of illustration and does not constitute a limitation on the present disclosure. According to the characteristics of the speckle array formed by performing array replication on the light-emitting point array through the beam-splitting point array and the effect of the superimposition of the light-emitting point array subjected to array replication through the third beam-splitting point array onto the original speckle array, a, b, c, and d are all positive integers less than or equal to 5. Preferably, a, b, c, and d are all positive integers less than or equal to 3.

With continued reference to FIG. 1a, before the design of the diffractive optical element 102 through the GS algorithm, the distribution of the points in the target map (beam-splitting point array) needs to be clarified, and the technical key point thereof lies in how to calculate the exact position of the target point, such as A', on which extension replication is to be performed, in the target map (beam-splitting point array), so as to ensure that no adhesion exists between the speckles in the speckle array after the added speckle block B' and the original speckle block B are superimposed.

Assuming that the length and height of the multi-point light source 101 are L and H, respectively, and the focal length of the collimating lens is f, according to a grating equation $D\sin(\theta)=k\lambda$, there is the following equation in ensuring that the adjacent blocks are just tightly spliced:

$$P_h = \frac{\lambda}{2\sin(\mathrm{atan}(L/(2f)))} \quad (1)$$

$$P_v = \frac{\lambda}{2\sin(\mathrm{atan}(H/(2f)))} \quad (2)$$

In the above equations, $P_h$ and $P_v$ are the minimum transverse period and the minimum longitudinal period of the microstructure of the diffractive optical element 102, respectively. When the beam-splitting point array is a standard beam-splitting point array, there are two methods that can be used to design the diffractive optical element 102: the small period design method and the large period design method. When extension replication is performed on the points at the edge of the beam-splitting point array, the large period design method is suitable for designing the diffractive optical element 102; when extension replication is performed on the points in other regions of the beam-splitting point array, both the small period design method and the large period design method are suitable. The method for increasing a speckle density may be carried out in the following two steps: 1. generating a beam-splitting point array target map; 2. adding the beam-splitting points formed by extension replication onto the beam-splitting point array target map. How to perform extension replication on the beam-splitting points will be described below.

According to a preferred embodiment of the present disclosure, the speckle array formed by projection through the third beam-splitting point array does not overlap with the speckle array formed by projection through the second beam-splitting point array, and light-emitting points of the multi-point light source are regularly arranged or randomly arranged.

With continued reference to FIG. 1b, the speckle array (original speckle array) formed by array replication through the second beam-splitting point array falls in the second speckle region, and the speckle array (newly added speckle array) formed by array replication through the third beam-splitting point array also falls in the second speckle region. In order to ensure that the newly added speckle array in this region is distinguishable from the original speckle array, the speckle array formed by projection through the third beam-splitting point array does not overlap with the speckle array formed by projection through the second beam-splitting point array so that the newly added speckles and the original speckles are spaced by a certain spacing.

According to a preferred embodiment of the present disclosure, when the light-emitting points of the multi-point light source are randomly arranged, the coordinates of a point A in the second beam-splitting point array are $(k_{xm}, k_{yn})$, the coordinates of a point A' obtained by performing extension replication on the point A are $(k_{xm}', k_{yn}')$, the coordinates of the point A and the coordinates of the point A' meet a grating equation, the vector between the coordinates of the point A and the coordinates of the point A' is e, and the angle sine spacings between the point A and the point A' in an x-direction and a y-direction meet:

$$\sin(\theta'_{xm}) - \sin(\theta_{xm}) \approx \frac{e_x}{2f}$$

$$\sin(\theta'_{yn}) - \sin(\theta_{yn}) \approx \frac{e_y}{2f}$$

where $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

The point distribution of the light-emitting points of the multi-point light source 101 is usually in two manners, i.e., regular arrangement or random arrangement, and the regular arrangement is easy to process. Taking the randomly arranged multi-point light source as an example, with continued reference to FIG. 1b, the point A is a beam-splitting point in the upper left corner of the second beam-splitting point array, and the coordinates of the point A are $(k_{xm}, k_{yn})$ and meet a grating equation:

$$P_h' \sin(\theta_{xm}) = k_{xm}\lambda \qquad (3)$$

$$P_v' \sin(\theta_{yn}) = k_{yn}\lambda \qquad (4)$$

where $\theta_{xm}$ and $\theta_{yn}$ are included angles of the coordinates of the point A in the x-direction and the y-direction.

The coordinates of the point A' formed by performing extension replication of the point A are $(k_{xm}', k_{yn}')$, the point A' is a beam-splitting point in the third beam-splitting point array, and the coordinates of the point A' also meet a grating equation:

$$P_h' \sin(\theta_{xm}') = k_{xm}'\lambda \qquad (5)$$

$$P_v' \sin(\theta_{yn}') = k_{yn}'\lambda \qquad (6)$$

The angle sine spacings between the point A and the point A' in the x-direction and the y-direction meet:

$$\sin(\theta'_{xm}) - \sin(\theta_{xm}) \approx \frac{e_x}{2f} \qquad (7)$$

$$\sin(\theta'_{yn}) - \sin(\theta_{yn}) \approx \frac{e_y}{2f} \qquad (8)$$

In the above equations, $\theta_{xm}'$ and $\theta_{yn}'$ are included angles of the coordinates of the point A' in the x-direction and the y-direction, the vector between the coordinates of the point A and the coordinates of the point A' is e, and $e_x$ and $e_y$ are components of the vector e in the x-direction and the y-direction, respectively. With the coordinates of the point A and the vector e known, the coordinates of the point A' of the vector e in a specific direction can be obtained through the simultaneous equations (3)-(8), and similarly, with the coordinates of each beam-splitting point in the second beam-splitting point array and the vector e known, the coordinates of the corresponding extended point in the third beam-splitting point array can be obtained. The vector e ranges from 0 to 360°, and the components of the vector e in the x-direction and the y-direction may be determined with reference to the minimum adjacent point spacing or the average adjacent point spacing of all or some of the light-emitting points.

According to a preferred embodiment of the present disclosure, the minimum adjacent point spacing or the average adjacent point spacing of the speckle array formed by projection through the second beam-splitting point array is E, and the distance between the speckle array formed by projection through the third beam-splitting point array and the speckle array formed by projection through the second beam-splitting point array is 0.4 E to 0.6 E.

With continued reference to FIG. 1b, the point A is a beam-splitting point in the upper left corner of the second beam-splitting point array, replication is performed on the light-emitting point array through the point A to form a speckle block B, the point A' is the extended point corresponding to the point A and is located in the third beam-splitting point array, replication is performed on the light-emitting point array through the point A' to form a speckle block B', and the amount of displacement of the speckle block B' with respect to the speckle block B, that is, the spacing in the speckle array, ranges from 0.4 E to 0.6 E, where E is the minimum adjacent point spacing or the average adjacent point spacing in the speckle block B. Preferably, the amount of displacement of the speckle block B' with respect to the speckle block B is about 0.5 E.

How to perform extension replication on the beam-splitting point is described above through a plurality of embodiments, and how to generate a beam-splitting point array target map will be described below with the large period design method as an example.

According to a preferred embodiment of the present disclosure, the step S11 further includes: designing, according to a large period design method, the beam-splitting point array, where the arrangement manner of the beam-splitting point array is a regular arrangement or a longitudinal and/or transverse periodic misalignment arrangement.

Figure 5A:
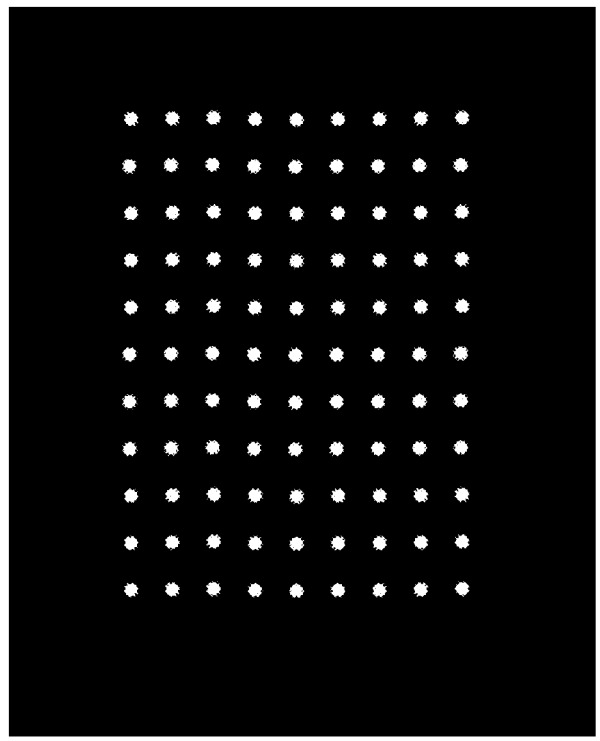
FIG. 5a shows a schematic diagram of a beam-splitting point array arranged in a regular manner according to an embodiment of the present disclosure.
Figure 5B:
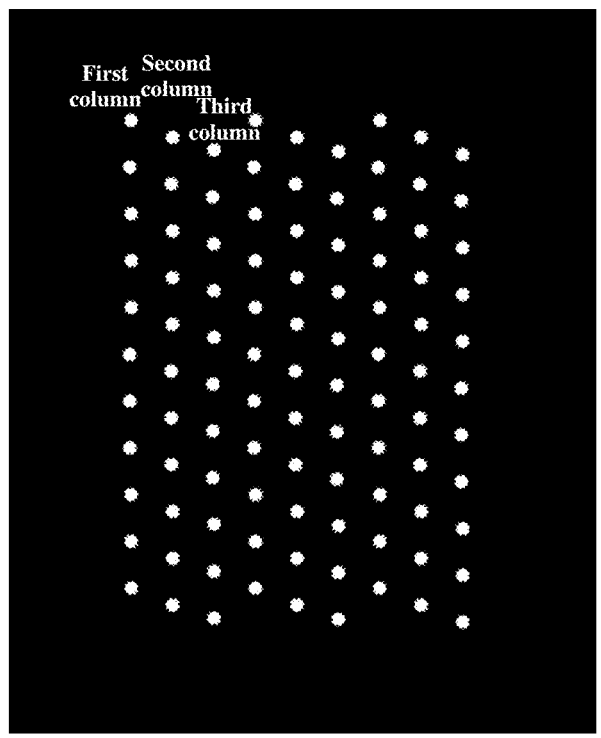
FIG. 5b shows a schematic diagram of a beam-splitting point array arranged in a periodic misalignment manner according to an embodiment of the present disclosure.

FIG. 5a shows a schematic diagram of a beam-splitting point array arranged in a regular manner according to an embodiment of the present disclosure. The beam-splitting point array of the diffractive optical element 102 designed according to the large period design method is regularly arranged. FIG. 5b shows a schematic diagram of a beam-splitting point array arranged in a periodic misalignment manner according to an embodiment of the present disclosure. The beam-splitting point array of the diffractive optical element 102 is first arranged in a regular manner, as shown in FIG. 5a, and then the signal points in the beam-splitting point array are misaligned according to a 1/3 period, for example, by keeping the coordinates of the beam-splitting points in the first column unchanged, longitudinally shifting the coordinates of the beam-splitting points in the adjacent second column downward by a 1/3 period, and longitudinally shifting the coordinates of the beam-splitting points in the adjacent third column downward by a 2/3 period. The above operation is repeatedly performed on the beam-splitting points in other columns, and finally, the 1/3 periodic misalignment arrangement as shown in FIG. 5b is formed. The above is only for the purpose of illustration, and the periodic misalignment of the beam-splitting point array does not constitute a limitation on the present disclosure.

According to a preferred embodiment of the present disclosure, the large period design method includes: in response to a diffractive optical element corresponding to an initial beam-splitting point array having a transverse period of $P_h$, a longitudinal period of $P_v$, a transverse target order of $[-i, -i+1, \ldots, i-1, i]$, and a longitudinal target order of

[−j, −j+1, ..., j−1, j], performing array replication on the transverse period and the longitudinal period of the diffractive optical element corresponding to the initial beam-splitting point array by a factor of M and N, respectively, where a diffractive optical element corresponding to the designed beam-splitting point array has a transverse period of $P_h'=M \times P_h$, a longitudinal period of $P_u'=N \times P_u$, a transverse target order of $M \times [-i, -i+1, ..., i-1, i]$, and a longitudinal target order of $N \times [-j, -j+1, ..., j-1, j]$.

Figure 6:
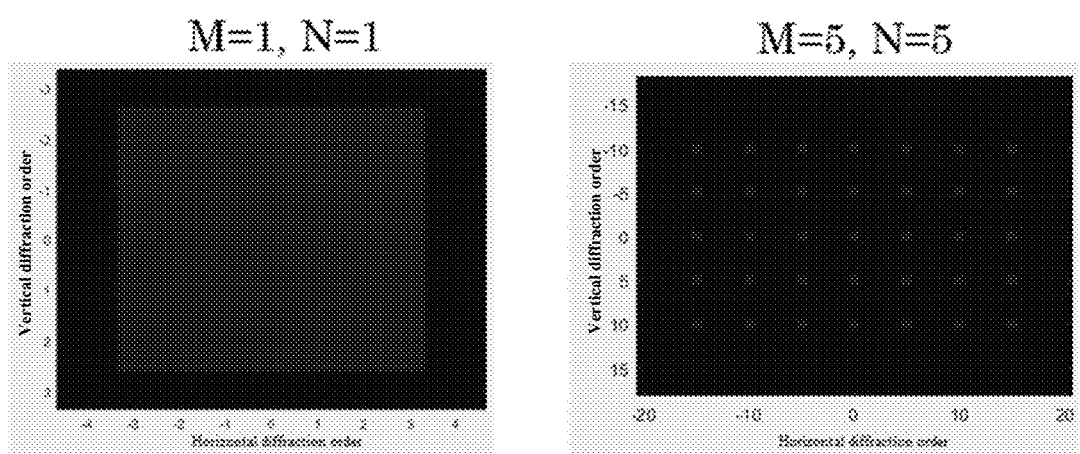
FIG. 6 shows a schematic diagram of a large period design method according to an embodiment of the present disclosure.

FIG. 6 shows a schematic diagram of a large period design method according to an embodiment of the present disclosure. The transverse period and the longitudinal period of a diffractive optical element corresponding to the diffractive optical element 102 are the minimum transverse period $P_h$ and the minimum longitudinal period $P_v$, respectively, and it is assumed that the transverse target order is $[-i, -i+1, ..., i-1, i]$, and the longitudinal target order is $[-j, -j+1, ..., j-1, j]$. After array replication is performed on the transverse period and the longitudinal period of the diffractive optical element 102 on the basis of $P_h$ and $P_v$ by a factor of M and N, respectively, $P_h'=M \times P_h$, and $P_u'=N \times P_u$. As can be seen from the grating equation, in the case that the target diffraction angle θ is unchanged and the ratio of a diffraction order k to a period is fixed, when the period is changed to M times or N times the original one, the corresponding diffraction order is also changed to M or N times the original one, and the transverse and longitudinal orders are $M \times [-i, -i+1, ..., i-1, i]$ and $N \times [-j, -j+1, ..., j-1, j]$ accordingly. As can be seen from FIG. 6, the larger the values of M and N, the larger spacing order between adjacent target signal orders, and the smaller the angular spacing between adjacent orders. At this point, the design of the standard beam-splitting point array target map with the large period design method is completed.

The method for increasing a speckle density is described above in detail through a plurality of embodiments, which prevents speckles from adhering to each other and meets the requirements for large fields of view and high recognition precision in the 3D recognition applications. Especially, for the speckle array projected onto a planar viewing screen, which has the problem of a significant decrease in the speckle density at the edge due to the distortion effect, the improvement effect on the recognition precision becomes better.

Figure 7:
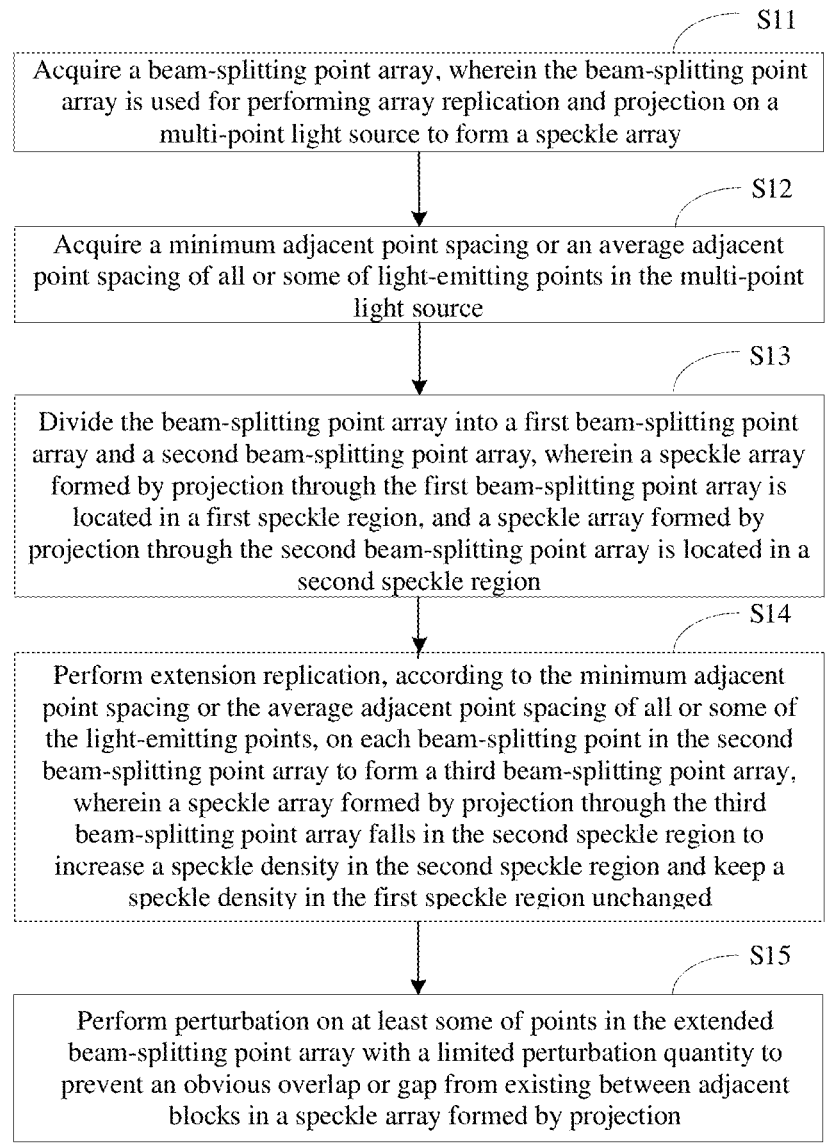
FIG. 7 shows a flowchart of a method for increasing a speckle density according to another embodiment of the present disclosure.

According to a preferred embodiment of the present disclosure, with reference to FIG. 7, the method further includes step S15.

In step S15, perturbation is performed on at least some of points in the extended beam-splitting point array with a preset perturbation quantity.

By performing perturbation on the extended beam-splitting point array, the deviation between the actual output light field and the target output light field can be reduced, and by performing perturbation with the preset perturbation quantity, no obvious overlap or gap exists between adjacent blocks in the speckle array. For example, after the beam-splitting point array of the diffractive optical element 102 is arranged in a regular manner or a periodic misalignment manner, the designed diffractive optical element 102 exhibits strong microstructure periodic repetition characteristics macroscopically. In order to reduce the deviation between the actual output light field and the target output light field, perturbation is performed on at least some of points in the extended beam-splitting point array with a preset perturbation quantity. The perturbation includes the shifting of at least some of the points in the beam-splitting point array, and by limiting the perturbation quantity, no obvious overlap or gap exists between adjacent blocks in a speckle array formed by projection.

According to a preferred embodiment of the present disclosure, the step S15 further includes: performing transverse and/or longitudinal random perturbation on at least some of the points in the extended beam-splitting point array to reduce the non-uniformity of a speckle array formed by projection.

Figure 5C:
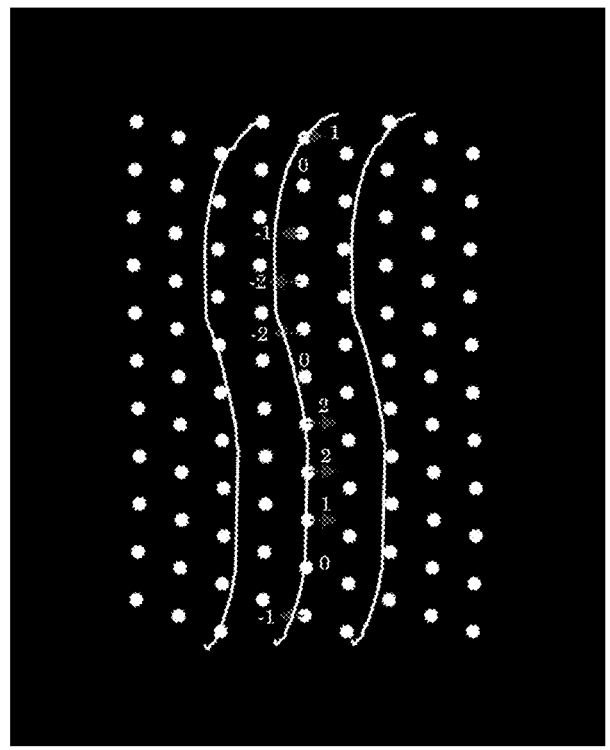
FIG. 5c shows a schematic diagram of performing perturbation on a beam-splitting point array according to an embodiment of the present disclosure.

FIG. 5c shows a schematic diagram of performing perturbation on a beam-splitting point array according to an embodiment of the present disclosure. The beam-splitting point array is first arranged in a regular manner, as shown in FIG. 5a, and then some of points in the beam-splitting point array are shifted so that, taking the middle column of beam-splitting points as an example, the first point is shifted to the right by one unit, that is, the perturbation quantity is one unit; the third point is shifted to the left by one unit, that is, the perturbation quantity is one unit; the fourth point is shifted to the left by two units, that is, the perturbation quantity is two units; the fifth point is shifted to the left by two units, that is, the perturbation quantity is two units, ..., and so on. The finally formed beam-splitting point array is shown in FIG. 5c. Since the perturbation quantity has reached the order of wavelength, the change in the beam-splitting point array obtained after perturbation is not obvious macroscopically, but the non-uniformity effect of the vector effect on the target output light field can be effectively reduced. Further, by performing perturbation with the preset perturbation quantity, no obvious overlap or gap exists between adjacent blocks in the speckle array. During the design of the diffractive optical element 102, by performing perturbation on the beam-splitting point array, the deviation between the actual output light field and the target output light field can be reduced, thereby effectively reducing the non-uniformity of the actual output light field.

In other embodiments, the non-uniformity of the actual output light field can also be reduced by performing transverse perturbation on the beam-splitting point array. Assuming that the beam-splitting point array is first arranged in a regular manner and the coordinates of a certain beam-splitting point are (id_x1, id_y1), the perturbation is to shift the coordinate position of this beam-splitting point to another coordinate position (id_x2, id_y2). When the horizontal coordinate changes from id_x1 to id_x2, the difference is the transverse perturbation quantity, and if the vertical coordinate id_y1=id_y2 at this point, the perturbation is the separate transverse perturbation. Preferably, transverse perturbation may be performed on some or all of beam-splitting points in the beam-splitting point array to reduce the non-uniformity of the actual output light field.

In summary, the speckle density in a specific region can be increased, no adhesion exists between speckles, and the requirements for large fields of view and high recognition precision in the 3D recognition applications are met. Especially, for the speckle array projected onto a planar viewing screen, which has the problem of a significant decrease in the speckle density at the edge due to the distortion effect, the improvement effect on the recognition precision becomes better.

Although the present specification provides the operating steps of the method as described in the embodiments or the flowcharts, more or fewer operating steps may be included based on routine or non-inventive labor. The order of steps enumerated in the embodiments is only one of a plurality of orders in which the steps may be performed and does not represent the unique order of execution. When the system or device product is executed in practice, the system or device product may be executed sequentially or in parallel according to the methods shown in the embodiments or the flowcharts.

The technical effects of the method for increasing a speckle density will be described below through embodiments.

Figure 8A:
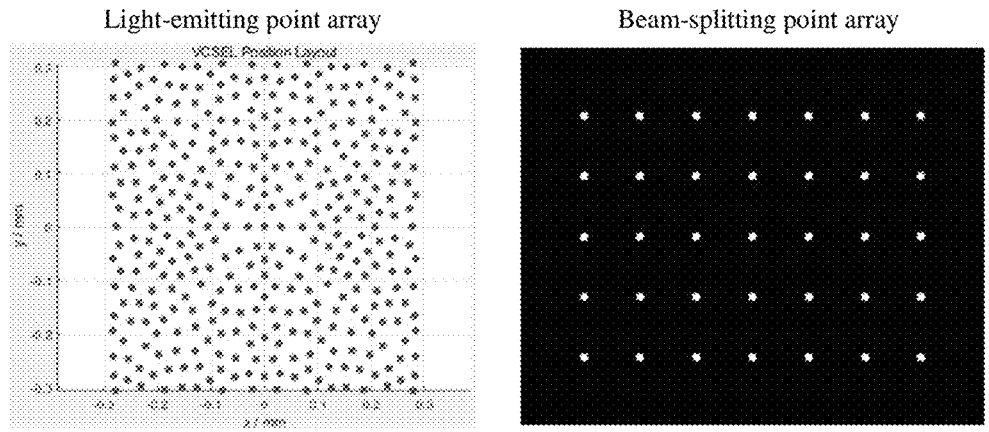
FIG. 8a shows a schematic diagram of a light-emitting point array and a beam-splitting point array according to an embodiment of the present disclosure.
Figure 8B:
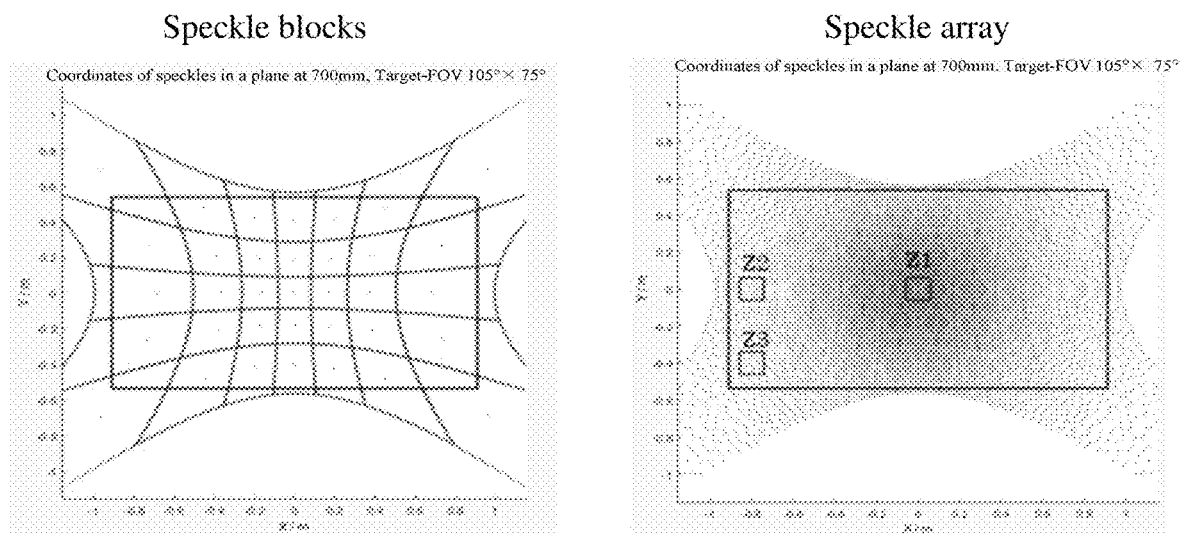

FIG. 8a shows a schematic diagram of a light-emitting point array and a beam-splitting point array according to an embodiment of the present disclosure. The multi-point light source 101 includes 361 VCSEL lasers arranged randomly, and the beam-splitting point array of the diffractive optical element 102 is a 5×7 standard point array. FIG. 8b shows a schematic diagram of speckle blocks and a speckle array in the embodiment of FIG. 8a, in which the borders of the speckle blocks are illustrated on the left, and the speckle array is illustrated on the right. Three regions are delineated in the speckle array with square borders: Z1, Z2 and Z3, where the number of speckles in the region Z1 is 181, the number of speckles in the region Z2 is 36, and the number of speckles in the region Z3 is 36.

Figure 8C:
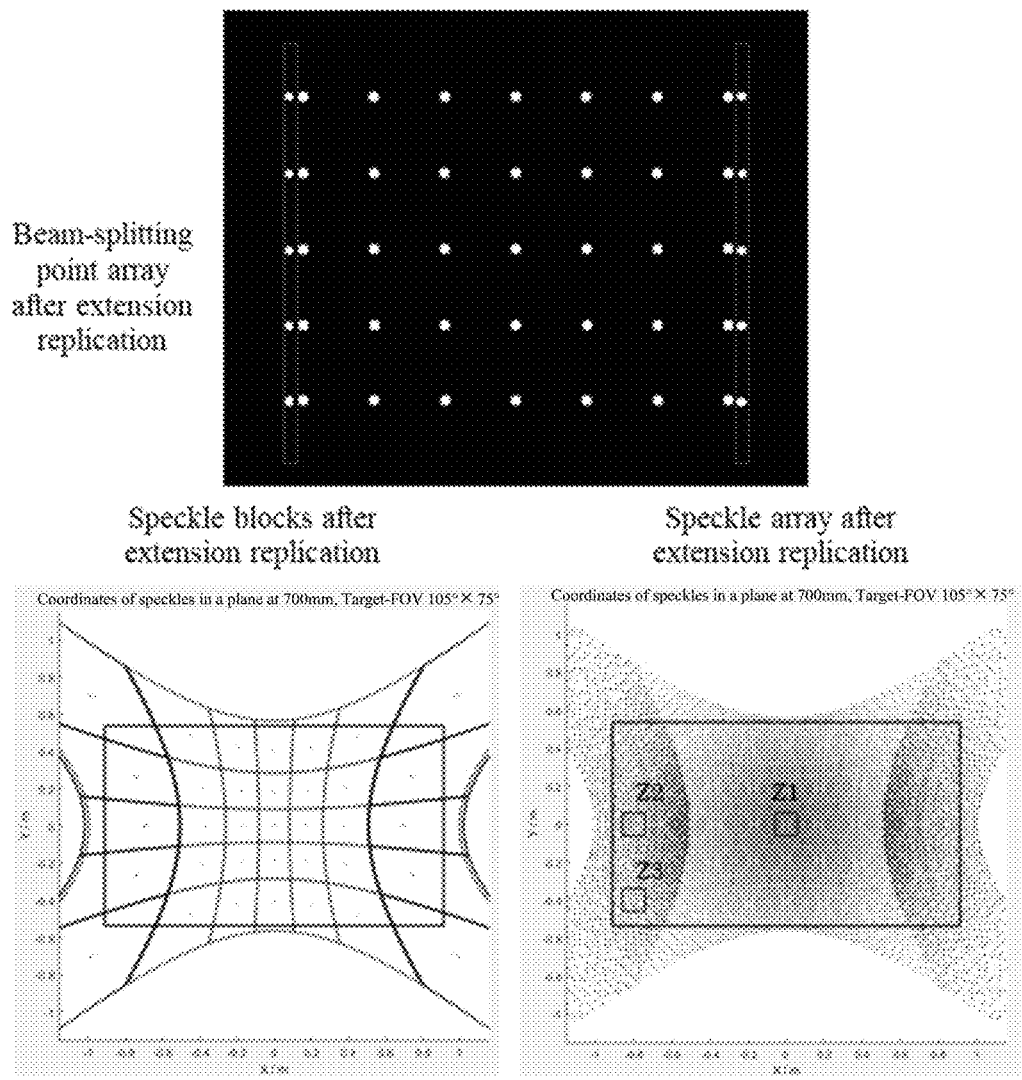

FIG. 8c shows a schematic diagram of a beam-splitting point array, speckle blocks, and a speckle array obtained after extension replication of the embodiment of FIG. 8a. The upper diagram of FIG. 8c shows a new beam-splitting point array formed by performing extension replication on the leftmost and rightmost columns of beam-splitting points in the initial beam-splitting point array, and the lower diagram of FIG. 8c shows the borders of the extended speckle blocks and the speckle array. Since extension replication is performed on the points at the edge of the beam-splitting point array, the speckle density in the central region of the speckle array is not affected. Therefore, the number of speckles in the region Z1 is still 181, the number of speckles in the region Z2 is increased to 66, and the number of speckles in the region Z3 is increased to 53. As can be seen from the comparison with FIG. 8b, the density of speckles at the edge of the speckle array is substantially increased, and specifically, the numbers of speckles in the regions Z2 and Z3 are both nearly doubled.

Figure 9A:
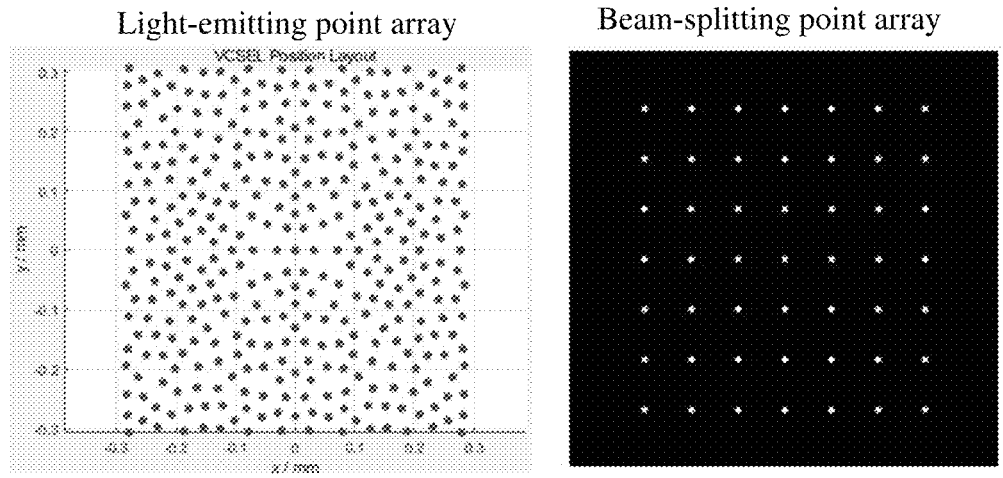
FIG. 9a shows a schematic diagram of a light-emitting point array and a beam-splitting point array according to another embodiment of the present disclosure.
Figure 9B:
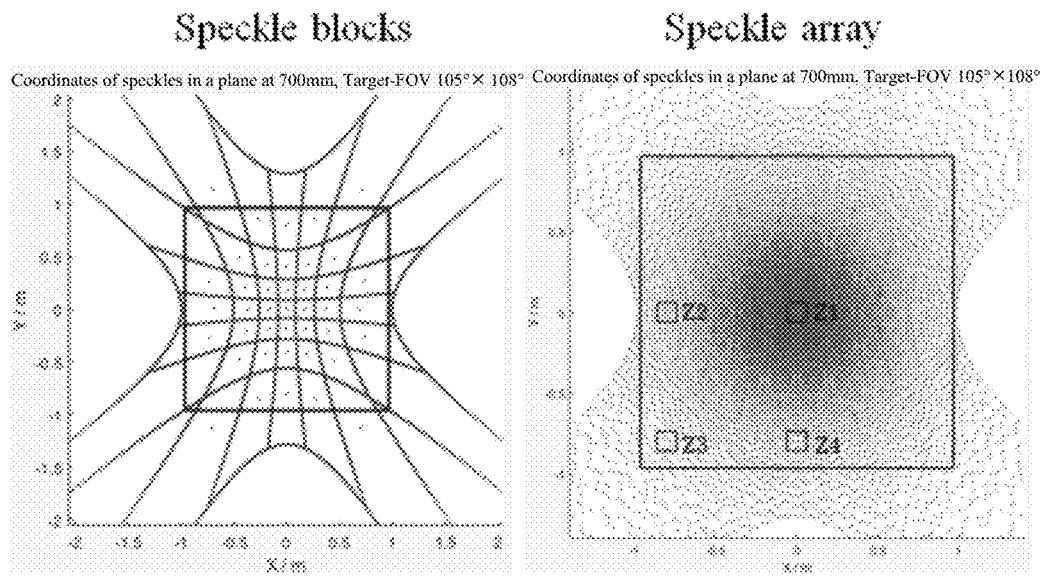

FIG. 9a shows a schematic diagram of a light-emitting point array and a beam-splitting point array according to another embodiment of the present disclosure. The multi-point light source 101 includes 361 VCSEL lasers arranged randomly, and the beam-splitting point array of the diffractive optical element 102 is a 7×7 standard point array. FIG. 9b shows a schematic diagram of speckle blocks and a speckle array in the embodiment of FIG. 9a, in which the borders of the speckle blocks are illustrated on the left, and the speckle array is illustrated on the right. Four regions are delineated in the speckle array with square borders: Z1, Z2, Z3, and Z4, where the number of speckles in the region Z1 is 181, the number of speckles in the region Z2 is 36, the number of speckles in the region Z3 is 15, and the number of speckles in the region Z4 is 34.

Figure 9C:
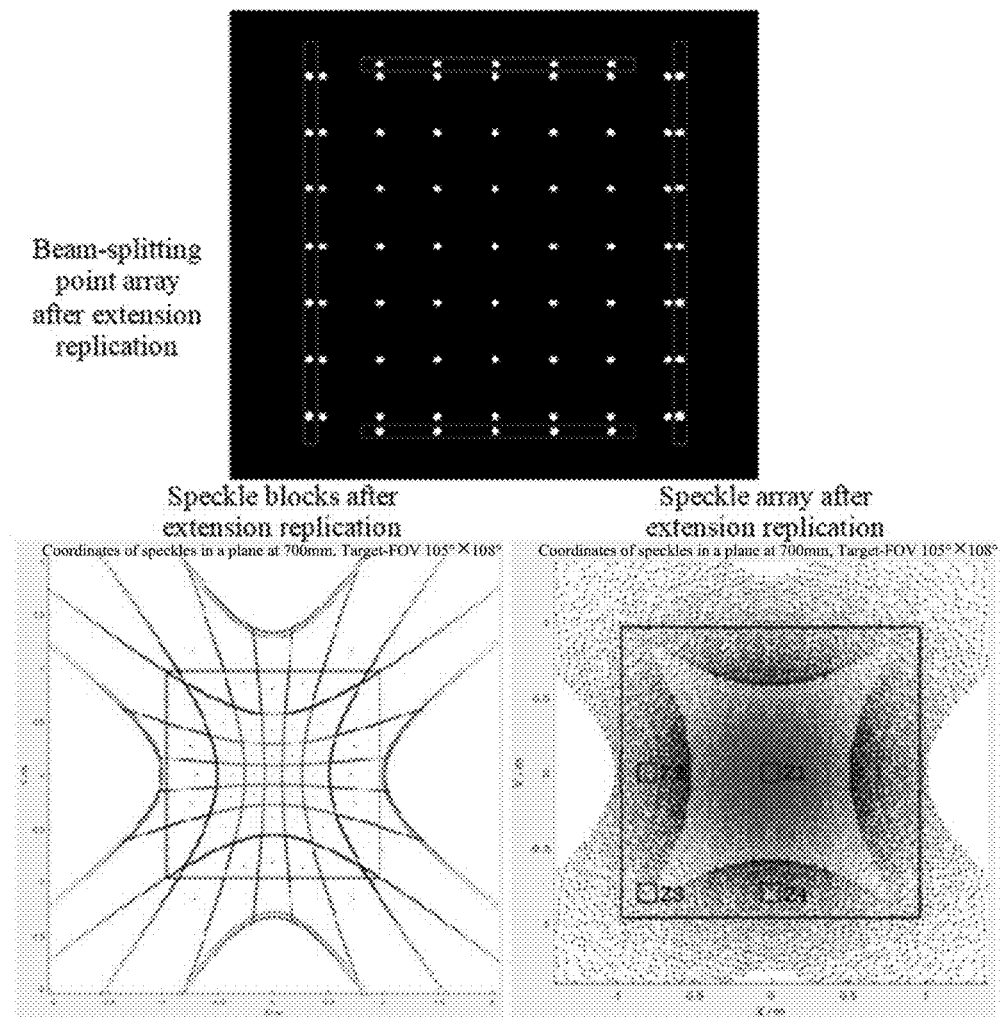

FIG. 9c shows a schematic diagram of a beam-splitting point array, speckle blocks, and a speckle array obtained after extension replication of the embodiment of FIG. 9a. The upper diagram of FIG. 9c shows a new beam-splitting point array formed by performing extension replication on the leftmost and rightmost columns of beam-splitting points and the uppermost and bottommost rows of beam-splitting points in the initial beam-splitting point array, but it should be noted that beam-splitting points at four corners of the initial beam-splitting point array are not subjected to repeated extension replication. The lower diagram of FIG. 9c shows the borders of the extended speckle blocks and the speckle array. Since extension replication is performed on the points at the edge of the beam-splitting point array, the speckle density in the central region of the speckle array is not affected. Therefore, the number of speckles in the region Z1 is still 181, the number of speckles in the region Z2 is increased to 66, the number of speckles in the region Z3 is increased to 27, and the number of speckles in the region Z4 is increased to 70. As can be seen from the comparison with FIG. 9b, the density of speckles at the edge of the speckle array is substantially increased, and specifically, the numbers of speckles in the regions Z2, Z3, and Z4 are all nearly doubled.

Figure 10A:
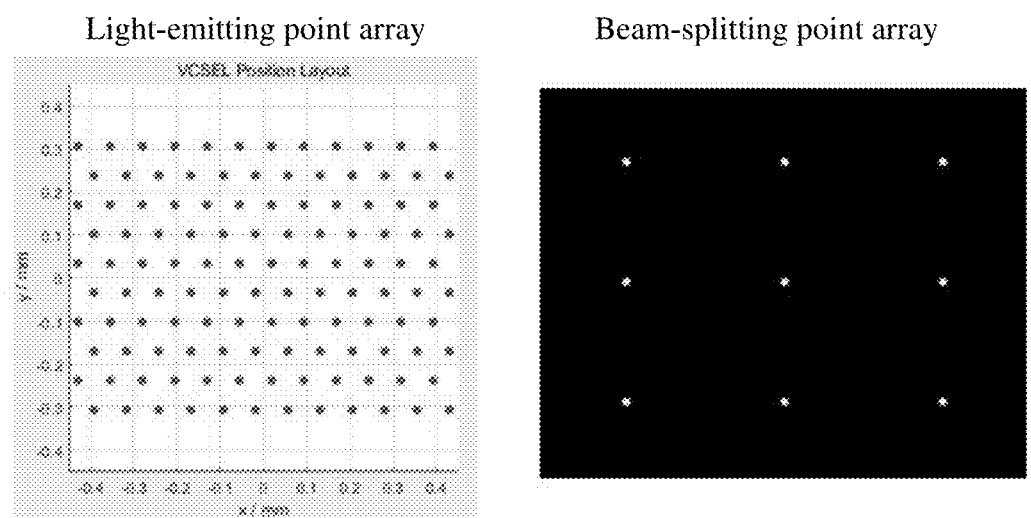
FIG. 10a shows a schematic diagram of a light-emitting point array and a beam-splitting point array according to another embodiment of the present disclosure.
Figure 10B:
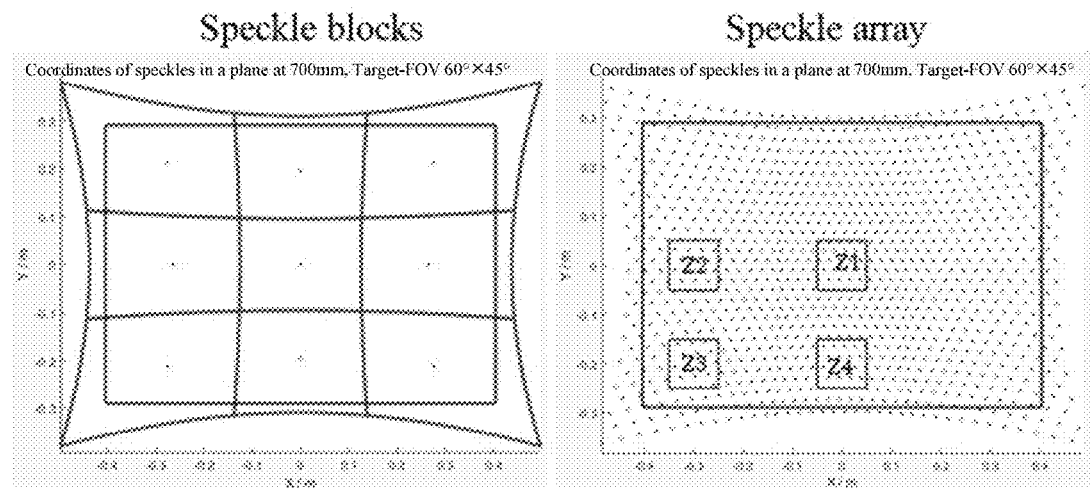

FIG. 10a shows a schematic diagram of a light-emitting point array and a beam-splitting point array according to another embodiment of the present disclosure. The multi-point light source 101 includes 120 VCSEL lasers arranged randomly, and the beam-splitting point array of the diffractive optical element 102 is a 3×3 standard point array. FIG. 10b shows a schematic diagram of speckle blocks and a speckle array in the embodiment of FIG. 10a, in which the borders of the speckle blocks are illustrated on the left, and the speckle array is illustrated on the right. Four regions are delineated in the speckle array with square borders: Z1, Z2 Z3, and Z4, where the number of speckles in the region Z1 is 30, the number of speckles in the region Z2 is 14, the number of speckles in the region Z3 is 17, and the number of speckles in the region Z4 is 20.

Figure 10C:
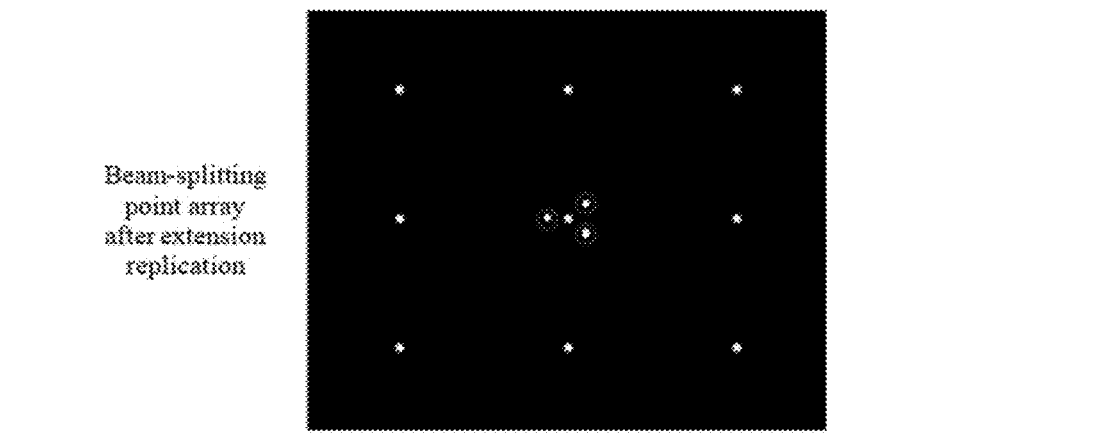
Figure 10C:
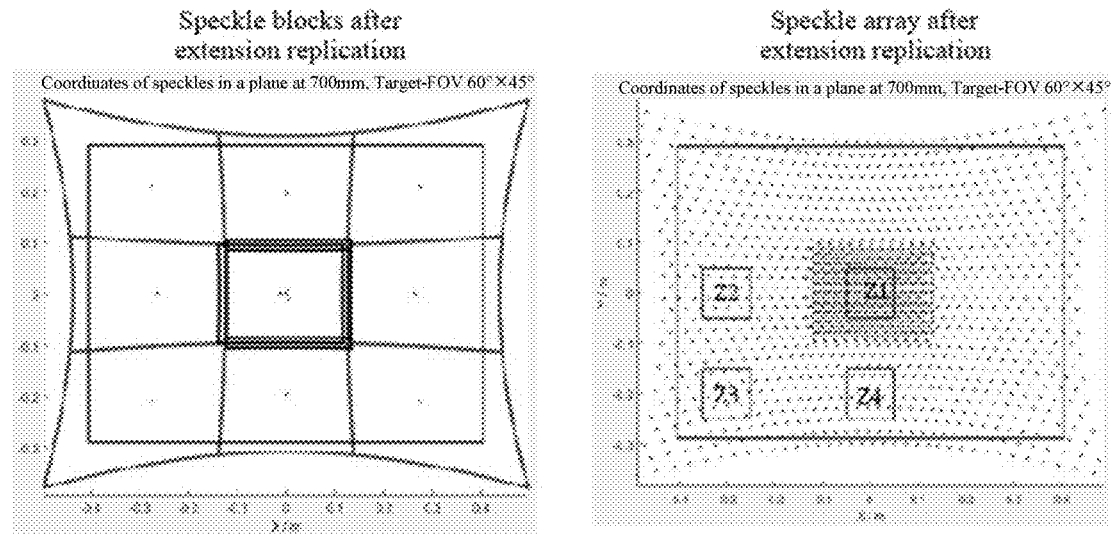

FIG. 10c shows a schematic diagram of a beam-splitting point array, speckle blocks, and a speckle array obtained after extension replication of the embodiment of FIG. 10a. The upper diagram of FIG. 10c shows a new beam-splitting point array formed by performing extension replication on the beam-splitting points in the center of the initial beam-splitting point array, and the beam-splitting points in three circles are newly added extended points. The lower diagram of FIG. 10c shows the borders of the extended speckle blocks and the speckle array. Since extension replication is performed on the beam-splitting points in the center of the beam-splitting point array, the speckle density in the edge region of the speckle array is not affected. Therefore, the numbers of speckles in the regions Z2, Z3, and Z4 remain unchanged, and the number of speckles in the region Z1 is increased to 105. As can be seen from the comparison with FIG. 10b, the density of speckles in the center of the speckle array is substantially increased, and specifically, the number of speckles in the region Z1 is increased to nearly four times.

The effect of the present disclosure in increasing the speckle density is described above through the embodiments. As can be seen, the present disclosure can increase the speckle density in a specific region and keep the speckle density of other regions unchanged, no adhesion exists between speckles, and the recognition precision is high.

The present disclosure further relates to a diffractive optical element. The diffractive optical element 102 implements a function of increasing a speckle density of a projected speckle array by performing array replication on a multi-point light source 101 and extension replication and includes a beam-splitting point array.

The beam-splitting point array includes a first beam-splitting point array, a second beam-splitting point array, and a third beam-splitting point array.

The first beam-splitting point array is used for performing array replication and projection on the multi-point light source to form a speckle array located in a first speckle region.

The second beam-splitting point array is used for performing array replication and projection on the multi-point light source to form a speckle array located in a second speckle region.

The third beam-splitting point array is formed by performing extension replication, according to a minimum adjacent point spacing or an average adjacent point spacing of all or some of light-emitting points in the multi-point light source, on each beam-splitting point in the second beam-splitting point array, where a speckle array formed by performing array replication and projection on the multi-point light source through the third beam-splitting point array falls in the second speckle region to increase the speckle density in the second speckle region and keep the speckle density in the first speckle region unchanged.

According to a preferred embodiment of the present disclosure, the second beam-splitting point array includes at least one of:

a columns of beam-splitting points on the leftmost side of the beam-splitting point array;
b columns of beam-splitting points on the rightmost side of the beam-splitting point array;
c rows of beam-splitting points on the uppermost side of the beam-splitting point array;
d rows of beam-splitting points on the bottommost side of the beam-splitting point array; or
e beam-splitting points in the central region of the beam-splitting point array; where a, b, c, d, and e are all positive integers.

According to a preferred embodiment of the present disclosure, a, b, c, and d are all positive integers less than or equal to 5.

According to a preferred embodiment of the present disclosure, the speckle array formed by projection through the third beam-splitting point array does not overlap with the speckle array formed by projection through the second beam-splitting point array, and the light-emitting points of the multi-point light source are regularly arranged or randomly arranged.

According to a preferred embodiment of the present disclosure, when the light-emitting points of the multi-point light source are randomly arranged, the coordinates of a point A in the second beam-splitting point array are ($k_{xm}$, $k_{yn}$), the coordinates of a point A' obtained by performing extension replication on the point A are ($k_{xm}'$, $k_{yn}'$), the coordinates of the point A and the coordinates of the point A' meet the grating equation, the vector between the coordinates of the point A and the coordinates of the point A' is e, and the angle sine spacings between the point A and the point A' in an x-direction and a y-direction meet:

$$\sin(\theta'_{xm}) - \sin(\theta_{xm}) \approx \frac{e_x}{2f}$$

$$\sin(\theta'_{yn}) - \sin(\theta_{yn}) \approx \frac{e_y}{2f}$$

where $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

According to a preferred embodiment of the present disclosure, the minimum adjacent point spacing or the average adjacent point spacing of the speckle array formed by projection through the second beam-splitting point array is E, and the distance between the speckle array formed by projection through the third beam-splitting point array and the speckle array formed by projection through the second beam-splitting point array is 0.4 E to 0.6 E.

According to a preferred embodiment of the present disclosure, extension replication is performed on each beam-splitting point in the second beam-splitting point array according to the minimum adjacent point spacing or the average adjacent point spacing to form a third beam-splitting point array, where the extending direction of each beam-splitting point is a direction of a line connecting the beam-splitting point with the center of the beam-splitting point array as a starting point.

According to a preferred of the present disclosure, the position of each beam-splitting point in the third beam-splitting point array is determined according to the position of each beam-splitting point in the second beam-splitting point array, the extending direction of each beam-splitting point, and the minimum adjacent point spacing or the average adjacent point spacing.

According to a preferred embodiment of the present disclosure, the beam-splitting point array is designed according to a large period design method, where the arrangement manner of the beam-splitting point array is a regular arrangement or a longitudinal and/or transverse periodic misalignment arrangement.

According to a preferred embodiment of the present disclosure, the large period design method includes: in response to a diffractive optical element corresponding to an initial beam-splitting point array having a transverse period of $P_h$, a longitudinal period of $P_u$, a transverse target order of $[-i, -i+1, \ldots, i-1, i]$, and a longitudinal target order of $[-j, -j+1, \ldots, j-1, j]$, performing array replication on the transverse period and the longitudinal period of the diffractive optical element corresponding to the initial beam-splitting point array by a factor of M and N, respectively, where a diffractive optical element corresponding to the designed beam-splitting point array has a transverse period of $P_h'=M \times P_h$, a longitudinal period of $P_u'=N \times P_u$, a transverse target order of $M \times [-i, -i+1, \ldots i-1, i]$, and a longitudinal target order of $N \times [-j, -j+1, \ldots, j-1, j]$.

According to a preferred embodiment of the present disclosure, perturbation is performed on at least some of points in the extended beam-splitting point array with a preset perturbation quantity.

According to a preferred of the present disclosure, transverse and/or longitudinal random perturbation is performed on at least some of the points in the extended beam-splitting point array to reduce the non-uniformity of a speckle array formed by projection.

The present disclosure further relates to a projector. The projector includes a multi-point light source and a diffractive optical element described above.

The multi-point light source is used for generating a light beam.

The diffractive optical element is disposed downstream of an optical path of the multi-point light source and is spaced by a preset distance from the multi-point light source.

Finally, it is to be noted that the above are merely preferred embodiments of the present disclosure and are not intended to limit the present disclosure. Although the embodiments of the present disclosure are described in detail with reference to the above-mentioned embodiments, those skilled in the art can still modify the technical schemes described in the above-mentioned embodiments, or make equivalent substitutions on some of the technical features therein. Any modifications, equivalent substitutions, improvements and the like within the spirit and principle of the present disclosure shall fall within the scope of protection of the present disclosure.

Article 1: A method for increasing a speckle density, comprising:

S11: acquiring a beam-splitting point array, wherein the beam-splitting point array is used for performing array replication and projection on a multi-point light source to form a speckle array;

S12: acquiring a minimum adjacent point spacing or an average adjacent point spacing of all or some of light-emitting points in the multi-point light source;

S13: dividing the beam-splitting point array into a first beam-splitting point array and a second beam-splitting point array, wherein a speckle array formed by projection through the first beam-splitting point array is located in a first speckle region, and a speckle array formed by projection through the second beam-splitting point array is located in a second speckle region; and S14: performing extension replication, according to the minimum adjacent point spacing or the average adjacent point spacing of all or some of the light-emitting points, on each beam-splitting point in the second beam-splitting point array to form a third beam-splitting point array, wherein a speckle array formed by projection through the third beam-splitting point array falls in the second speckle region to increase a speckle density in the second speckle region and keep a speckle density in the first speckle region unchanged.

Article 2: The method according to Article 1, wherein the second beam-splitting point array comprises at least one of:

a columns of beam-splitting points on a leftmost side of the beam-splitting point array;

b columns of beam-splitting points on a rightmost side of the beam-splitting point array;

c rows of beam-splitting points on an uppermost side of the beam-splitting point array;

d rows of beam-splitting points on a bottommost side of the beam-splitting point array; or e beam-splitting points in a central region of the beam-splitting point array;

wherein a, b, c, d, and e are all positive integers.

Article 3: The method according to Article 2, wherein a, b, c, and d are all positive integers less than or equal to 5.

Article 4: The method according to Article 1, wherein the speckle array formed by projection through the third beam-splitting point array does not overlap with the speckle array formed by projection through the second beam-splitting point array, and the light-emitting points of the multi-point light source are regularly arranged or randomly arranged.

Article 5: The method according to Article 4, wherein when the light-emitting points of the multi-point light source are randomly arranged, coordinates of a point A in the second beam-splitting point array are $(k_{xm}, k_{yn})$, coordinates of a point A' obtained by performing extension replication on the point A are $(k_{xm}', k_{yn}')$, the coordinates of the point A and the coordinates of the point A' meet a grating equation, a vector between the coordinates of the point A and the coordinates of the point A' is e, and angle sine spacings between the point A and the point A' in an x-direction and a y-direction meet:

$$\sin(\theta_{xm}') - \sin(\theta_{xm}) \approx \frac{e_x}{2f}$$

$$\sin(\theta_{yn}') - \sin(\theta_{yn}) \approx \frac{e_y}{2f}$$

wherein $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

Article 6: The method according to Article 1, wherein a minimum adjacent point spacing or an average adjacent point spacing of the speckle array formed by projection through the second beam-splitting point array is E, and a distance between the speckle array formed by projection through the third beam-splitting point array and the speckle array formed by projection through the second beam-splitting point array is 0.4 E to 0.6 E.

Article 7: The method according to Article 1, wherein the step S14 comprises: performing extension replication, according to the minimum adjacent point spacing or the average adjacent point spacing, on each beam-splitting point in the second beam-splitting point array to form the third beam-splitting point array, wherein an extending direction of each beam-splitting point is a direction of a line connecting the beam-splitting point with a center of the beam-splitting point array as a starting point.

Article 8: The method according to Article 7, wherein the step S14 further comprises: determining, according to a position of each beam-splitting point in the second beam-splitting point array, the extending direction of each beam-splitting point, and the minimum adjacent point spacing or the average adjacent point spacing, a position of each beam-splitting point in the third beam-splitting point array.

Article 9: The method according to any one of Articles 1 to 8, wherein the step S11 further comprises: designing, according to a large period design method, the beam-splitting point array, wherein an arrangement manner of the beam-splitting point array is a regular arrangement or a longitudinal and/or transverse periodic misalignment arrangement.

Article 10: The method according to Article 9, wherein the large period design method comprises: in response to a diffractive optical element corresponding to an initial beam-splitting point array having a transverse period of $P_h$, a longitudinal period of $P_u$, a transverse target order of [−i, −i+1, ... i−1, i], and a longitudinal target order of [−j, −j+1, ... , j−1, j], performing array replication on the transverse period and the longitudinal period of the diffractive optical element corresponding to the initial beam-splitting point array by a factor of M and N, respectively, wherein a designed beam-splitting point array has a transverse period of $P_h' = M \times P_h$, a longitudinal period of $P_u' = N \times P_u$, a transverse target order of M×[−i, −i+1, ... i−1, i], and a longitudinal target order of N×[−j, −j+1, ... , j−1, j].

Article 11: The method according to any one of Articles 1 to 8, further comprising:

S15: performing perturbation on at least some of the points in an extended beam-splitting point array with a preset perturbation quantity.

Article 12: The method according to Article 11, wherein the step S15 further comprises: performing transverse and/or longitudinal random perturbation on at least some of the points in the extended beam-splitting point array to reduce non-uniformity of a speckle array formed by projection.

Article 13: A diffractive optical element, which implements a function of increasing a speckle density of a projected speckle array by performing array replication on a multi-point light source and extension replication, wherein the diffractive optical element comprises:

a beam-splitting point array, wherein the beam-splitting point array comprises:

a first beam-splitting point array, which is used for performing array replication and projection on the multi-point light source to form a speckle array located in a first speckle region;

a second beam-splitting point array, which is used for performing array replication and projection on the multi-point light source to form a speckle array located in a second speckle region; and a third beam-splitting point array, which is formed by performing extension replication, according to a minimum adjacent point spacing or an average adjacent point spacing of all or some of light-emitting points in the multi-point light source, on each beam-splitting point in the second beam-splitting point array, wherein a speckle array formed by performing array replication and projection on the multi-point light source through the third beam-splitting point array falls in the second speckle region to increase a speckle density in the second speckle region and keep a speckle density in the first speckle region unchanged.

Article 14: The diffractive optical element according to Article 13, wherein the second beam-splitting point array comprises at least one of:

a columns of beam-splitting points on a leftmost side of the beam-splitting point array;

b columns of beam-splitting points on a rightmost side of the beam-splitting point array;

c rows of beam-splitting points on an uppermost side of the beam-splitting point array;

d rows of beam-splitting points on a bottommost side of the beam-splitting point array; or e beam-splitting points in a central region of the beam-splitting point array;

wherein a, b, c, d, and e are all positive integers.

Article 15: The diffractive optical element according to Article 14, wherein a, b, c, and d are all positive integers less than or equal to 5.

Article 16: The diffractive optical element according to Article 13, wherein the speckle array formed by projection through the third beam-splitting point array does not overlap with the speckle array formed by projection through the second beam-splitting point array, and light-emitting points of the multi-point light source are regularly arranged or randomly arranged.

Article 17: The diffractive optical element according to Article 16, wherein when the light-emitting points of the multi-point light source are randomly arranged, coordinates of a point A in the second beam-splitting point array are $(k_{xm}, k_{yn})$, coordinates of a point A' obtained by performing extension replication on the point A are $(k_{xm}', k_{yn}')$, the coordinates of the point A and the coordinates of the point A' meet a grating equation, a vector between the coordinates of the point A and the coordinates of the point A' is e, and angle sine spacings between the point A and the point A' in an x-direction and a y-direction meet:

$$\sin(\theta'_{xm}) - \sin(\theta_{xm}) \approx \frac{e_x}{2f}$$

$$\sin(\theta'_{yn}) - \sin(\theta_{yn}) \approx \frac{e_y}{2f}$$

wherein $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, and the vector e ranges from 0 to 360°.

Article 18: The diffractive optical element according to Article 13, wherein a minimum adjacent point spacing or an average adjacent point spacing of the speckle array formed by projection through the second beam-splitting point array is E, and a distance between the speckle array formed by projection through the third beam-splitting point array and the speckle array formed by projection through the second beam-splitting point array is 0.4 E to 0.6 E.

Article 19: The diffractive optical element according to Article 13, wherein extension replication is performed on each beam-splitting point in the second beam-splitting point array according to the minimum adjacent point spacing or the average adjacent point spacing to form the third beam-splitting point array, wherein an extending direction of each beam-splitting point is a direction of a line connecting the beam-splitting point with a center of the beam-splitting point array as a starting point.

Article 20: The diffractive optical element according to Article 19, wherein a position of each beam-splitting point in the third beam-splitting point array is determined according to a position of each beam-splitting point in the second beam-splitting point array, the extending direction of each beam-splitting point, and the minimum adjacent point spacing or the average adjacent point spacing.

Article 21: The diffractive optical element according to any one of Articles 13 to 20, wherein the beam-splitting point array is designed according to a large period design method, wherein an arrangement manner of the beam-splitting point array is a regular arrangement or a longitudinal and/or transverse periodic misalignment arrangement.

Article 22: The diffractive optical element according to Article 21, wherein the large period design method comprises: in response to a diffractive optical element corresponding to an initial beam-splitting point array having a transverse period of $P_h$, a longitudinal period of $P_u$, a transverse target order of $[-i, -i+1, \ldots, i-1, i]$, and a longitudinal target order of $[-j, -j+1, \ldots, j-1, j]$, performing array replication on the transverse period and the longitudinal period of the diffractive optical element corresponding to the initial beam-splitting point array by a factor of M and N, respectively, wherein a diffractive optical element corresponding to a designed beam-splitting point array has a transverse period of $P_h'=M\times P_h$, a longitudinal period of $P_u'=N\times P_u$, a transverse target order of $M\times[-i, -i+1, \ldots, i-1, i]$, and a longitudinal target order of $N\times[, -j+1, \ldots, j-1, j]$.

Article 23: The diffractive optical element according to any one of Articles 13 to 20, wherein perturbation is performed on at least some of points in an extended beam-splitting point array with a preset perturbation quantity.

Article 24: The diffractive optical element according to Article 23, wherein transverse and/or longitudinal random perturbation is performed on at least some of the points in the extended beam-splitting point array to reduce the non-uniformity of a speckle array formed by projection.

Article 25: A projector, comprising:
a multi-point light source, which is used for generating a light beam; and
the diffractive optical element according to any one of Articles 13 to 24, which is disposed downstream of an optical path of the multi-point light source and is spaced by a preset distance from the multi-point light source.

What is claimed is:
1. A method for increasing a speckle density, comprising:
S11: acquiring a beam-splitting point array, wherein the beam-splitting point array is used for performing array replication and projection on a multi-point light source to form a speckle array;
S12: acquiring a minimum adjacent point spacing or an average adjacent point spacing of all or some of light-emitting points in the multi-point light source;
S13: dividing the beam-splitting point array into a first beam-splitting point array and a second beam-splitting point array, wherein a speckle array formed by projection through the first beam-splitting point array is located in a first speckle region, and a speckle array formed by projection through the second beam-splitting point array is located in a second speckle region; and
S14: performing extension replication, according to the minimum adjacent point spacing or the average adjacent point spacing of all or some of the light-emitting points, on each beam-splitting point in the second beam-splitting point array to form a third beam-splitting point array, wherein a speckle array formed by projection through the third beam-splitting point array falls in the second speckle region to increase a speckle density in the second speckle region and keep a speckle density in the first speckle region unchanged.

2. The method according to claim 1, wherein the second beam-splitting point array comprises at least one of:
a columns of beam-splitting points on a leftmost side of the beam-splitting point array;
b columns of beam-splitting points on a rightmost side of the beam-splitting point array;
c rows of beam-splitting points on an uppermost side of the beam-splitting point array;
d rows of beam-splitting points on a bottommost side of the beam-splitting point array; or
e beam-splitting points in a central region of the beam-splitting point array;
wherein a, b, c, d, and e are all positive integers.

3. The method according to claim 2, wherein a, b, c, and d are all positive integers less than or equal to 5.

4. The method according to claim 1, wherein the speckle array formed by projection through the third beam-splitting point array does not overlap with the speckle array formed by projection through the second beam-splitting point array, and the light-emitting points of the multi-point light source are regularly arranged or randomly arranged.

5. The method according to claim 4, wherein when the light-emitting points of the multi-point light source are randomly arranged, coordinates of a point A in the second beam-splitting point array are $(k_{xm}, k_{yn})$, coordinates of a point A' obtained by performing extension replication on the point A are $(k_{xm}', k_{yn}')$, the coordinates of the point A and the coordinates of the point A' meet a grating equation, a vector between the coordinates of the point A and the coordinates of the point A' is e, and angle sine spacings between the point A and the point A' in an x-direction and a y-direction meet:

$$\sin(\theta'_{xm}) - \sin(\theta_{xm}) \approx \frac{e_x}{2f}$$

$$\sin(\theta'_{yn}) - \sin(\theta_{yn}) \approx \frac{e_y}{2f}$$

wherein $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, the vector e ranges from 0 to 360°, and f is a focal length of a collimating lens.

6. The method according to claim 1, wherein a minimum adjacent point spacing or an average adjacent point spacing of the speckle array formed by projection through the second beam-splitting point array is E, and a distance between the speckle array formed by projection through the third beam-splitting point array and the speckle array formed by projection through the second beam-splitting point array is 0.4 E to 0.6 E.

7. The method according to claim 1, wherein the step S14 comprises: performing extension replication, according to the minimum adjacent point spacing or the average adjacent point spacing, on each beam-splitting point in the second beam-splitting point array to form the third beam-splitting point array, wherein an extending direction of each beam-splitting point is a direction of a line connecting the beam-splitting point with a center of the beam-splitting point array as a starting point.

8. The method according to claim 7, wherein the step S14 further comprises: determining, according to a position of each beam-splitting point in the second beam-splitting point array, the extending direction of each beam-splitting point, and the minimum adjacent point spacing or the average adjacent point spacing, a position of each beam-splitting point in the third beam-splitting point array.

9. The method according to claim 1, wherein the step S11 further comprises: designing, according to a large period design method, the beam-splitting point array, wherein an arrangement manner of the beam-splitting point array is a regular arrangement or a longitudinal and/or transverse periodic misalignment arrangement.

10. The method according to claim 9, wherein the large period design method comprises: in response to a diffractive optical element corresponding to an initial beam-splitting point array having a transverse period of $P_h$, a longitudinal period of $P_u$, a transverse target order of $[-i, -i+1, \ldots, i-1, i]$, and a longitudinal target order of $[-j, -j+1, \ldots, j-1, j]$, performing array replication on the transverse period and the longitudinal period of the diffractive optical element corresponding to the initial beam-splitting point array by a factor of M and N, respectively, wherein a designed beam-splitting point array has a transverse period of $P_h'=M \times P_h$, a longitudinal period of $P_u'=N \times P_u$, a transverse target order of $M \times [-i, -i+1, \ldots, i-1, i]$, and a longitudinal target order of $N \times [-j, -j+1, \ldots, j-1, j]$.

11. The method according to claim 1, further comprising:
S15: performing perturbation on at least some of points in an extended beam-splitting point array with a preset perturbation quantity.

12. The method according to claim 11, wherein the step S15 further comprises: performing transverse and/or longitudinal random perturbation on at least some of the points in the extended beam-splitting point array to reduce non-uniformity of a speckle array formed by projection.

13. A diffractive optical element, which implements a function of increasing a speckle density of a projected speckle array by performing array replication on a multi-point light source and extension replication, wherein the diffractive optical element comprises:

a beam-splitting point array, wherein the beam-splitting point array comprises:

a first beam-splitting point array, which is used for performing array replication and projection on the multi-point light source to form a speckle array located in a first speckle region;

a second beam-splitting point array, which is used for performing array replication and projection on the multi-point light source to form a speckle array located in a second speckle region; and a third beam-splitting point array, which is formed by performing extension replication, according to a minimum adjacent point spacing or an average adjacent point spacing of all or some of light-emitting points in the multi-point light source, on each beam-splitting point in the second beam-splitting point array, wherein a speckle array formed by performing array replication and projection on the multi-point light source through the third beam-splitting point array falls in the second speckle region to increase a speckle density in the second speckle region and keep a speckle density in the first speckle region unchanged.

14. The diffractive optical element according to claim 13, wherein the second beam-splitting point array comprises at least one of:

a columns of beam-splitting points on a leftmost side of the beam-splitting point array;

b columns of beam-splitting points on a rightmost side of the beam-splitting point array;

c rows of beam-splitting points on an uppermost side of the beam-splitting point array;

d rows of beam-splitting points on a bottommost side of the beam-splitting point array; or e beam-splitting points in a central region of the beam-splitting point array;

wherein a, b, c, d, and e are all positive integers, or wherein a, b, c, and d are all positive integers less than or equal to 5.

15. The diffractive optical element according to claim 13, wherein the speckle array formed by projection through the third beam-splitting point array does not overlap with the speckle array formed by projection through the second beam-splitting point array, and light-emitting points of the multi-point light source are regularly arranged or randomly arranged, or wherein when the light-emitting points of the multi-point light source are randomly arranged, coordinates of a point A in the second beam-splitting point array are $(k_{xm}, k_{yn})$, coordinates of a point A' obtained by performing extension replication on the point A are $(k_{xm}', k_{yn}')$, the coordinates of the point A and the coordinates of the point A' meet a grating equation, a vector between the coordinates of the point A and the coordinates of the point A' is e, and angle sine spacings between the point A and the point A' in an x-direction and a y-direction meet:

$$\sin(\theta_{xm}') - \sin(\theta_{xm}) \approx \frac{e_x}{2f}$$

$$\sin(\theta_{yn}') - \sin(\theta_{yn}) \approx \frac{e_y}{2f}$$

wherein $\theta_{xm}$ and $\theta_{yn}$ are included angles of the coordinates of the point A in the x-direction and the y-direction, $\theta_{xm}'$ and $\theta_{yn}'$ are included angles of the coordinates of the point A' in the x-direction and the y-direction, $e_x$ and $e_y$ are components of the vector e in the x-direction and the y-direction, the vector e ranges from 0 to 360°, and f is a focal length of a collimating lens.

16. The diffractive optical element according to claim 13, wherein a minimum adjacent point spacing or an average adjacent point spacing of the speckle array formed by projection through the second beam-splitting point array is E, and a distance between the speckle array formed by projection through the third beam-splitting point array and the speckle array formed by projection through the second beam-splitting point array is 0.4 E to 0.6 E.

17. The diffractive optical element according to claim 13, wherein extension replication is performed on each beam-splitting point in the second beam-splitting point array according to the minimum adjacent point spacing or the average adjacent point spacing to form the third beam-splitting point array, wherein an extending direction of each beam-splitting point is a direction of a line connecting the beam-splitting point with a center of the beam-splitting point array as a starting point, or wherein a position of each beam-splitting point in the third beam-splitting point array is determined according to a position of each beam-splitting point in the second beam-splitting point array, the extending direction of each beam-splitting point, and the minimum adjacent point spacing or the average adjacent point spacing.

18. The diffractive optical element according to claim 13, wherein the beam-splitting point array is designed according to a large period design method, wherein an arrangement manner of the beam-splitting point array is a regular arrangement or a longitudinal and/or transverse periodic misalignment arrangement, or wherein the large period design method comprises: in response to a diffractive optical element corresponding to an initial beam-splitting point array having a transverse period of $P_h$, a longitudinal period of $P_u$, a transverse target order of $[-i, -i+1, \ldots, i-1, i]$, and a longitudinal target order of $[-j, -j+1, \ldots, j-1, j]$, performing array replication on the transverse period and the longitudinal period of the diffractive optical element corresponding to the initial beam-splitting point array by a factor of M and N, respectively, wherein a diffractive optical element corresponding to a designed beam-splitting point array has a transverse period of $P_h'=M\times P_h$, a longitudinal period of $P_u'=N\times P_u$, a transverse target order of $M\times[-i, -i+1, \ldots, i-1, i]$, and a longitudinal target order of $N\times[-j, -j+1, \ldots, j-1, j]$.

19. The diffractive optical element according to claim 13, wherein perturbation is performed on at least some of points in an extended beam-splitting point array with a preset perturbation quantity, or wherein transverse and/or longitudinal random perturbation is performed on at least some of the points in the extended beam-splitting point array to reduce non-uniformity of a speckle array formed by projection.

20. A projector, comprising:
a multi-point light source, which is used for generating a light beam; and
a diffractive optical element, which is disposed downstream of an optical path of the multi-point light source and is spaced by a preset distance from the multi-point light source, and implements a function of increasing a speckle density of a projected speckle array by performing array replication on the multi-point light source and extension replication, wherein the diffractive optical element comprises:
a beam-splitting point array, wherein the beam-splitting point array comprises:
   a first beam-splitting point array, which is used for performing array replication and projection on the multi-point light source to form a speckle array located in a first speckle region;
   a second beam-splitting point array, which is used for performing array replication and projection on the multi-point light source to form a speckle array located in a second speckle region; and
   a third beam-splitting point array, which is formed by performing extension replication, according to a minimum adjacent point spacing or an average adjacent point spacing of all or some of light-emitting points in the multi-point light source, on each beam-splitting point in the second beam-splitting point array, wherein a speckle array formed by performing array replication and projection on the multi-point light source through the third beam-splitting point array falls in the second speckle region to increase a speckle density in the second speckle region and keep a speckle density in the first speckle region unchanged.

* * * * *